US011459197B2

(12) United States Patent
Fujii et al.

(10) Patent No.: US 11,459,197 B2
(45) Date of Patent: Oct. 4, 2022

(54) DOCUMENT FEEDER

(71) Applicant: KYOCERA Document Solutions Inc., Osaka (JP)

(72) Inventors: Koji Fujii, Osaka (JP); Taro Kurahashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 191 days.

(21) Appl. No.: 17/065,728

(22) Filed: Oct. 8, 2020

(65) Prior Publication Data

US 2021/0107754 A1 Apr. 15, 2021

(30) Foreign Application Priority Data

Oct. 9, 2019 (JP) .............................. JP2019-186087
Sep. 11, 2020 (JP) .............................. JP2020-153357

(51) Int. Cl.
| | | |
|---|---|---|
| B65H 1/14 | (2006.01) | |
| B65H 3/06 | (2006.01) | |
| B65H 7/18 | (2006.01) | |
| B65H 7/04 | (2006.01) | |
| B65H 3/52 | (2006.01) | |
| B65H 5/06 | (2006.01) | |
| H04N 1/00 | (2006.01) | |

(52) U.S. Cl.
CPC ......... B65H 5/062 (2013.01); H04N 1/00602 (2013.01); *B65H 2801/39* (2013.01)

(58) Field of Classification Search
CPC .......... B65H 1/14; B65H 1/08; B65H 3/0684; B65H 3/0669; B65H 3/5261; B65H 7/02; B65H 7/04; B65H 7/18; B65H 7/20; B65H 7/12; B65H 7/125; B65H 5/062; B65H 2511/414; B65H 2511/51; B65H 2511/515; B65H 2513/412; G03G 15/602
See application file for complete search history.

(56) References Cited

U.S. PATENT DOCUMENTS

| | | | | |
|---|---|---|---|---|
| 6,091,927 A * | 7/2000 | Hattori | ..................... | B65H 1/18 |
| | | | | 271/127 |
| 8,038,140 B2 * | 10/2011 | Kimura | ................. | B65H 3/0684 |
| | | | | 271/4.03 |
| 8,355,182 B2 * | 1/2013 | Matsuo | .............. | H04N 1/32657 |
| | | | | 358/1.15 |
| 2019/0055099 A1 * | 2/2019 | Tsuzuki | ................ | B65H 3/0669 |
| 2020/0385225 A1 * | 12/2020 | Mitamura | ............ | B65H 3/0669 |
| 2021/0009372 A1 * | 1/2021 | Suga | ..................... | B65H 3/0684 |
| 2021/0107753 A1 * | 4/2021 | Fujii | ......................... | B65H 1/14 |
| 2021/0187977 A1 * | 6/2021 | Yasukawa | ............ | B65H 3/5284 |

FOREIGN PATENT DOCUMENTS

JP          2002-041118          2/2002

* cited by examiner

*Primary Examiner* — Luis A Gonzalez
(74) *Attorney, Agent, or Firm* — Lex IP Meister, PLLC

(57) ABSTRACT

The document feeder includes a lift plate, a pickup roller, a lift motor, a retard roller, and a control unit. In a manual feed mode, the control unit rotates the retard roller to feed a document in a document conveyance direction. Further, the control unit causes the lift motor to start lowering the lift plate while the pickup roller is feeding a document after starting to rotate the pickup roller. When there is a document set on the lift plate at the time when the pickup roller stops, the control unit automatically resumes the feeding in the manual feed mode.

7 Claims, 13 Drawing Sheets

FIG. 14

| MODE | CONTENT OF OPERATION |
|---|---|
| ONLY NORMAL MODE | ・OPERATE NORMAL MODE SELECTION BUTTON |
| ONLY CONTINUOUS READ MODE | ・OPERATE CONTINUOUS READ MODE SELECTION BUTTON<br>・NOT CHECK IN AUTOMATIC CHANGE PERMISSION CHECK BOX |
| ONLY SINGLE-SHEET READ MODE | ・OPERATE SINGLE-SHEET READ MODE SELECTION BUTTON<br>・NOT CHECK IN AUTOMATIC CHANGE PERMISSION CHECK BOX |

DOCUMENT FEEDER

INCORPORATION BY REFERENCE

This application is based upon, and claims the benefit of priority from, corresponding Japanese Patent Applications JP 2019-186087 filed Oct. 9, 2019, and JP 2020-153357 filed Sep. 11, 2020, the entire contents of which are incorporated herein by reference.

BACKGROUND

Field of the Invention

The present disclosure relates to a document feeder that feeds and conveys a set document.

Description of Related Art

There is an image reading device having a document feeder (for example, a multifunction device). The document feeder feeds set documents one by one. Image data is generated by reading the fed document. In the document feeder, a plurality of documents may be fed and conveyed in an overlapping manner. There are cases where documents are fed so that the large parts of the documents overlap each other, or a preceding document overlaps a part of the following document. A separation mechanism may be provided to eliminate the overlap. The separation mechanism includes, for example, a separation roller. The separation roller rotates to feed a document in a direction opposite to a document conveyance direction (upstream direction). The separation roller separates the documents which are double fed, and sends back an unnecessary document. The separation roller contributes to eliminate the double feeding.

SUMMARY

A document feeder according to claim 1 includes a lift plate, a pickup roller, a lift motor, a retard roller, a document set sensor, an operation panel, and a control unit. Documents are set on the lift plate. The pickup roller contacts an uppermost document among the documents set on the lift plate. The pickup roller rotates to feed a document in a document conveyance direction. The lift motor raises and lowers the lift plate. When starting feeding, the lift motor raises the lift plate until the uppermost document comes into contact with the pickup roller. The retard roller is provided on a downstream side of the pickup roller in the document conveyance direction. The retard roller is in contact with the document fed by the pickup roller. The document set sensor detects whether the document is set on the lift plate. The operation panel receives a selection of a mode. When a normal mode is selected, the control unit rotates the pickup roller to feed the document in the document conveyance direction, and rotates the retard roller to feed the document in a direction opposite to the document conveyance direction. When a manual feed mode is selected, the control unit rotates the pickup roller and the retard roller to feed the document in the document conveyance direction. After the pickup roller starts rotating, the control unit causes the lift motor to start lowering the lift plate while the pickup roller is feeding the document. The control unit stops the pickup roller and the retard roller after the trailing edge of the document has passed through the retard roller. Further, when a continuous read mode in the manual feed mode is selected, the control unit recognizes whether there is a document set on the lift plate based on the output of the document set sensor. At the time when the pickup roller and the retard roller are stopped, when there is a document set on the lift plate, the control unit re-raises the lift plate until the uppermost document comes into contact with the pickup roller. After completing the re-rise, the control unit rotates the pickup roller and the retard roller to feed the document in the document conveyance direction, and automatically restarts sheet feeding in the manual feed mode.

BRIEF DESCRIPTION OF THE DRAWINGS

FIG. 14 is a diagram showing an example of the operation when the automatic mode change is not permitted.

DETAILED DESCRIPTION

Hereinafter, an example of a document feeder 1 according to an embodiment will be described with reference to FIGS. 1 to 14. In the following description, a multifunction peripheral 100 including the document feeder 1 will be described as an example. However, each element such as the configuration and arrangement described in each embodiment does not limit the scope of the disclosure, and is merely an example for explanation.

(Multifunction Peripheral 100)

Figure 1:
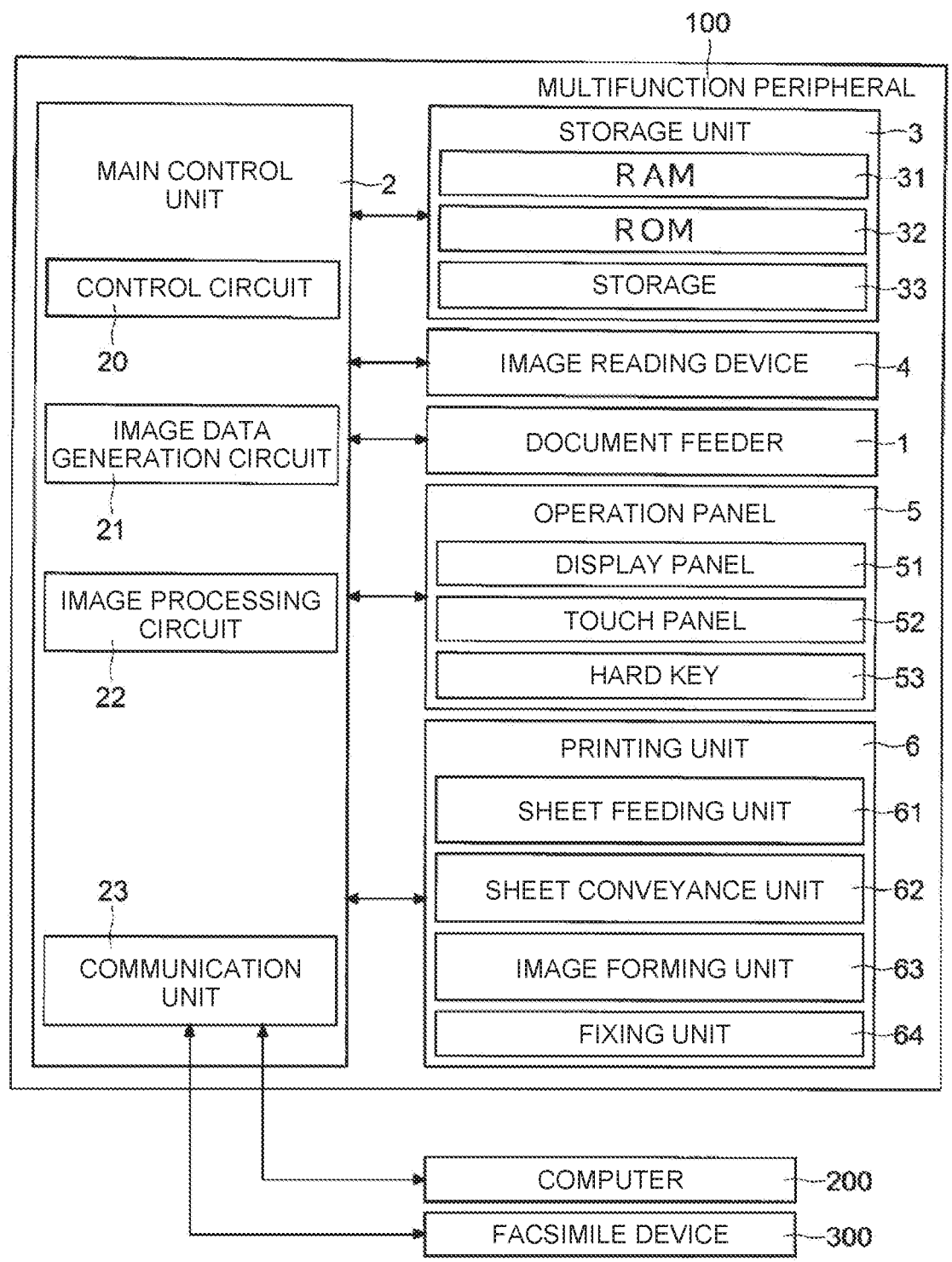
FIG. 1 is a diagram showing an example of a multifunction peripheral according to an embodiment.

An example of the multifunction peripheral 100 according to the embodiment will be described with reference to FIG. 1. FIG. 1 is a diagram showing an example of the multifunction peripheral 100 according to the embodiment.

As shown in FIG. 1, the multifunction peripheral 100 includes a main control unit 2, a storage unit 3, an image reading device 4, an operation panel 5, and a printing unit 6, in addition to the document feeder 1.

The main control unit 2 controls the operation of the multifunction peripheral 100. The main control unit 2 controls the operation of each unit of the multifunction peripheral 100 for a job such as copying or transmission. The main control unit 2 is a substrate that includes a control circuit 20, an image data generation circuit 21, an image processing circuit 22, and a communication unit 23. The control circuit 20 is, for example, a central processing unit (CPU). The control circuit 20 executes processing and calculation related to the job.

The image data generation circuit 21 generates read image data based on an analog image signal, which is output by reading a document by the image reading device 4. The image data generation circuit 21 includes, for example, an amplification circuit, an offset circuit, and an analog/digital (A/D) conversion circuit, as a circuit that processes an analog image signal. The A/D conversion circuit converts an analog image signal adjusted by the amplification circuit and the offset circuit into digital data (image data). The image processing circuit 22 executes image processing. The image processing circuit 22 processes read image data, and generates image data for printing or transmission. The image processing circuit 22 is, for example, an application specific integrated circuit (ASIC) (integrated circuit designed and developed for image processing).

The communication unit 23 includes a communication circuit and a communication memory. The communication unit 23 communicates with a computer 200 and a facsimile device 300. The computer 200 is, for example, a personal computer (PC) or a server. The operation panel 5 accepts the setting for a destination. The main control unit 2 causes the communication unit 23 to transmit image data based on document reading to the set destination (scan transmission, facsimile transmission).

The communication unit 23 also receives print data from the computer 200 or the facsimile device 300. The main control unit 2 causes the printing unit 6 to print based on the received print data (print job, facsimile reception printing).

The storage unit 3 includes a plurality of types of storage devices. The storage unit 3 includes, for example, a random access memory (RAM) 31, a read only memory (ROM) 32, and a storage 33 (hard disk (HDD) or solid state drive (SSD)) as a storage device. The main control unit 2 controls each unit based on a program and data in the storage unit 3.

The operation panel 5 receives the setting by a user. The operation panel 5 includes a display panel 51, a touch panel 52, and a hard key 53. The main control unit 2 causes the display panel 51 to display a message and a setting screen. The main control unit 2 further causes the display panel 51 to display an image for operation. The image for operation is, for example, a button, a key, or a tab. The main control unit 2 recognizes the image for operation, which is operated, based on the output of the touch panel 52. The hard key 53 includes a start key and a numeric keypad. The touch panel 52 and the hard key 53 receive a setting operation (an operation related to a job) by a user. For example, the operation panel 5 receives a selection of a read mode for a document. The main control unit 2 recognizes the setting content based on the output of the operation panel 5.

The printing unit 6 includes a sheet feeding unit 61, a sheet conveyance unit 62, an image forming unit 63, and a fixing unit 64. The sheet feeding unit 61 includes a sheet feeding cassette and a pickup roller. The sheet feeding cassette accommodates a sheet. The pickup roller feeds a sheet. In the case of a print job, the main control unit 2 causes the sheet feeding unit 61 to supply a sheet. The sheet conveyance unit 62 includes a sheet conveyance roller pair and a sheet conveyance motor for conveying a sheet. The sheet conveyance roller pair conveys a sheet. The sheet conveyance motor rotates the sheet conveyance roller pair. The main control unit 2 causes the sheet conveyance unit 62 to convey a sheet.

The image forming unit 63 includes, for example, a photosensitive drum, a charging device, an exposure device, a developing device, and a transfer roller. The main control unit 2 causes the image forming unit 63 to form a toner image based on image data. The main control unit 2 causes the image forming unit 63 to transfer the toner image to a conveyance sheet. The fixing unit 64 includes a heater, a fixing rotating member, and a fixing motor. The heater heats the fixing rotating member. The sheet is conveyed while being in contact with the fixing rotating member. Accordingly, the toner image is fixed on the sheet. The fixing motor rotates the fixing rotating member. The main control unit 2 causes the fixing unit 64 to fix the transferred toner image on the sheet. The sheet conveyance unit 62 discharges the printed sheet to the outside of the device.

(Document Feeder 1 and Image Reading Device 4)

Figure 2:
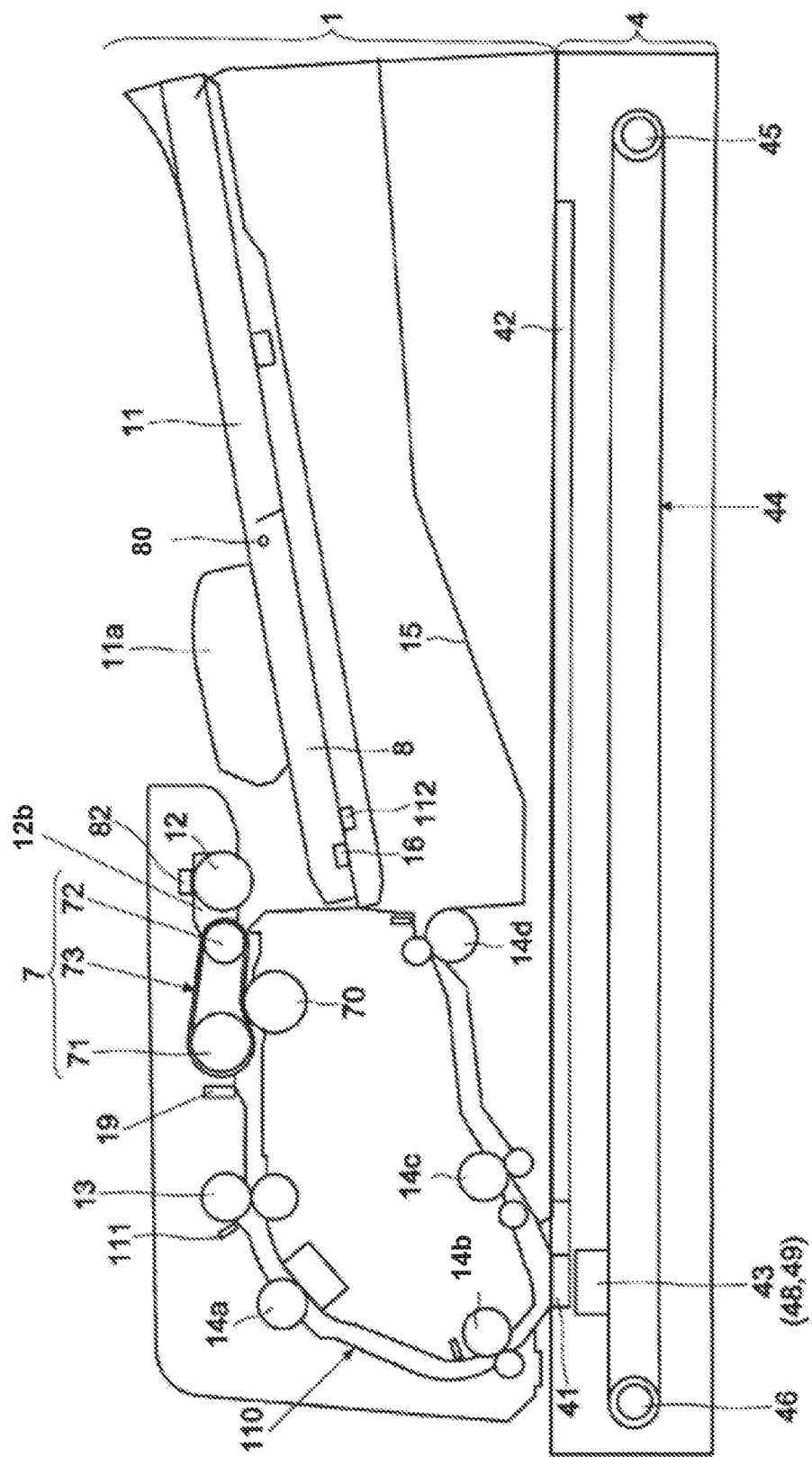
FIG. 2 is a diagram showing an example of a document feeder and an image reading unit according to the embodiment.
Figure 3:
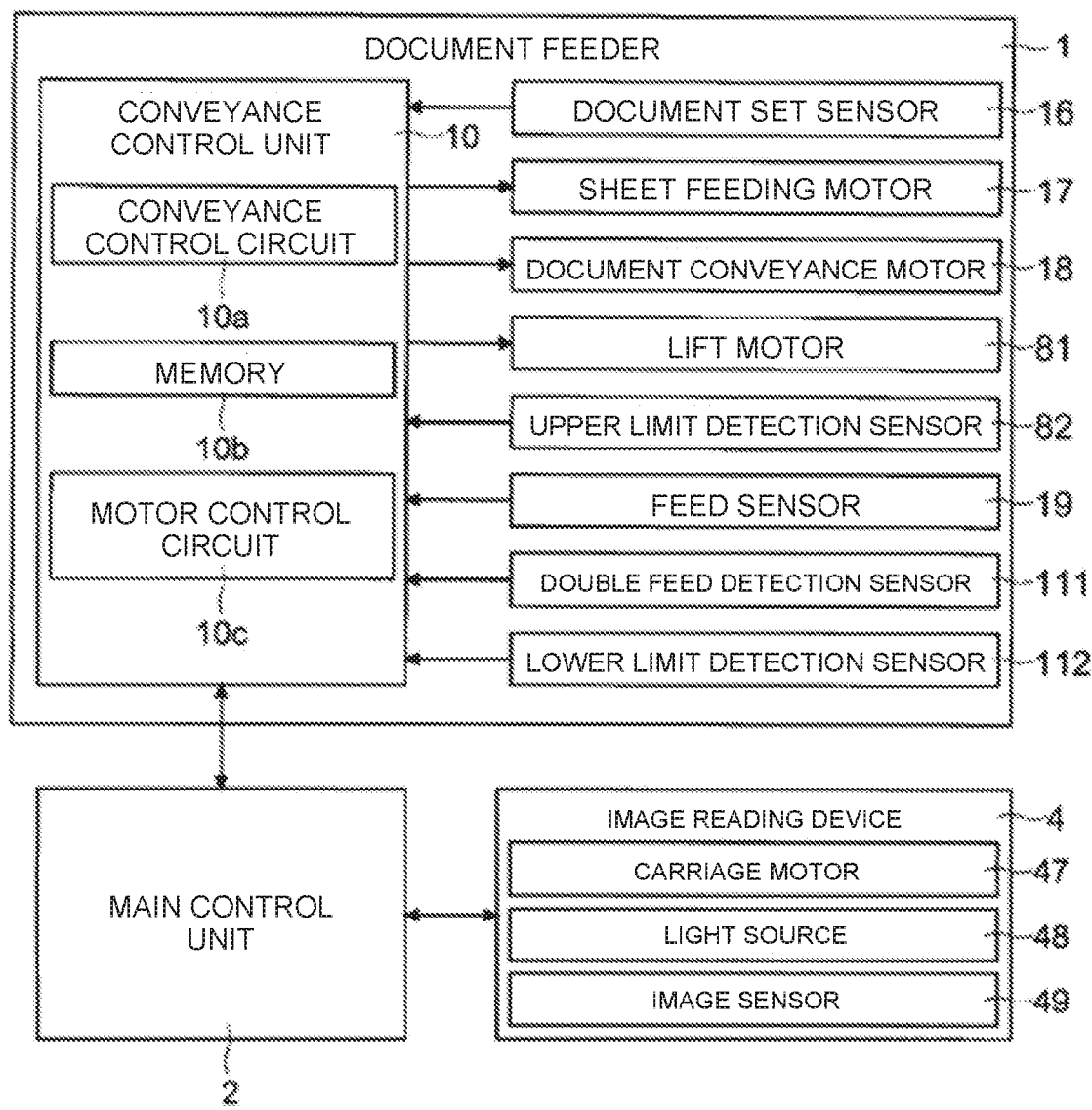
FIG. 3 is a diagram showing an example of the document feeder and the image reading unit according to the embodiment.

Next, the document feeder 1 and the image reading device 4 according to the embodiment will be described with reference to FIGS. 2 to 3. FIGS. 2 and 3 are diagrams showing an example of the document feeder 1 and the image reading unit 4 according to the embodiment.

The image reading device 4 includes a conveyance reading contact glass 41 and a document table 42 (table reading contact glass). The conveyance reading contact glass 41 and the document table 42 are disposed on the upper surface of the image reading device 4. When executing the conveyance reading, a user sets one or more documents on a lift plate 8 (document tray 11). When a document is set on the document feeder 1 (lift plate 8), the main control unit 2 causes the image reading device 4 to execute the conveyance reading. The conveyance reading is reading a document conveyed by the document feeder 1.

When no document is set on the lift plate 8 (document tray 11), the main control unit 2 causes the image reading device 4 to execute table reading. The table reading is reading a document set on the document table 42. When executing the table reading, a user sets a document on one surface (upper surface) of the document table 42.

The image reading device 4 includes a carriage 43, a moving belt 44, a first reading pulley 45, a second reading pulley 46, and a carriage motor 47 (see FIG. 3). The carriage 43 is a contact image sensor (CIS) type scan unit. The image reading device 4 may include a charge coupled device (CCD) type reading unit.

The moving belt 44 has an endless shape. The moving belt 44 is wound around each pulley. The moving belt 44 is connected to the carriage 43. When moving the carriage 43, the main control unit 2 rotates the carriage motor 47. The carriage motor 47 rotates the first reading pulley 45 or the second reading pulley 46. As a result, the moving belt 44 goes around. The carriage motor 47 can rotate forward and backward. When the moving belt 44 goes around, the carriage 43 moves in the horizontal direction (the sub-scanning direction, the direction perpendicular to the main scanning direction, the right-left direction in FIG. 2). The carriage 43 moves on the other surface side (lower side) of each contact glass.

The carriage 43 includes a light source 48, a lens, and an image sensor 49 (see FIG. 3). When reading a document, the main control unit 2 turns on the light source 48. The light source 48 irradiates the document with light through the conveyance reading contact glass 41 or the document table 42. The light source 48 is, for example, a light emitting diode (LED). The lens guides the reflected light from the document to each light receiving element of the image sensor 49. The image sensor 49 reads the document placed on the document table 42 or the document to be conveyed on the conveyance reading contact glass 41. The image sensor 49 is a line sensor. The image sensor 49 includes a plurality of light receiving elements (photoelectric conversion elements, pixels).

The light receiving element receives the light reflected by the document. Each of the light receiving elements outputs an analog image signal corresponding to the amount of the received light (reflected light amount). The analog image signals are input to the main control unit 2. The image data generation circuit 21 in the main control unit 2 generates read image data based on the input analog image signals.

In conveyance reading, the main control unit 2 moves the carriage 43 (the position of the reading line of the image sensor 49) to below the conveyance reading contact glass 41. The carriage 43 reads a document passing over the conveyance reading contact glass 41. In table reading, the main control unit 2 moves the carriage 43 at a predetermined speed in the sub-scanning direction below the document table 42. During the movement, the carriage 43 reads the document set on the document table 42.

The document feeder 1 is provided above the image reading device 4. The document feeder 1 conveys the set document toward a reading position (the conveyance reading contact glass 41). The document feeder 1 conveys documents one by one. The document feeder 1 opens and closes in the up-down direction with the back side of the paper plane of FIG. 2 as a fulcrum. The document feeder 1 also functions as a cover for pressing each contact glass of the image reading device 4 from above.

As shown in FIG. 2, the document feeder 1 includes a document tray 11, a pickup roller 12, a separation conveyance unit 7, a registration roller pair 13, a plurality of conveyance rollers 14a, 14b, and 14c, a discharge roller pair 14d, and a document discharge tray 15, in order from the upstream side in a document conveyance direction.

The document tray 11 is a portion at which a document is set. The pickup roller 12 (corresponding to the sheet feed rotary member), the rotary member included in the separation conveyance unit 7, the registration roller pair 13, the plurality of conveyance rollers 14a, 14b, and 14c, and the discharge roller pair 14d are rotary members that feed a document. The fed document is finally discharged to the document discharge tray 15.

As shown in FIG. 3, the document feeder 1 includes a conveyance control unit 10 (corresponding to a control unit), a document set sensor 16, a sheet feeding motor 17, a document conveyance motor 18, a lift motor 81, and an upper limit detection sensor 82. The sheet feeding motor 17 and the document conveyance motor 18 are motors for rotating a rotating member for conveying a document. For example, a stepping motor can be used for the sheet feeding motor 17, the document conveyance motor 18, and the lift motor 81.

The conveyance control unit 10 and the main control unit 2 are connected to each other by a signal line, and can communicate with each other. The conveyance control unit 10 is, for example, a substrate. For example, the conveyance control unit 10 includes a conveyance control circuit 10a (CPU), a memory 10b (RAM, ROM), and a motor control circuit 10c. The motor control circuit 10c is, for example, a motor driver IC. The motor control circuit 10c controls the rotation, stop, and rotation speed of each motor in the document feeder 1.

A regulation cursor pair 11a for regulating a document is provided on the document tray 11. The regulation cursor pair 11a can be moved in a direction perpendicular to the document conveyance direction. The regulation cursor pair 11a is interlocked. The regulation cursor pair 11a is slid and moved to hold the document. Accordingly, the position of the document in the direction perpendicular to the document conveyance direction is not shifted.

A part of the document tray 11 on the downstream side in the conveyance direction becomes the lift plate 8. The lift plate 8 is a part of the document tray 11. Setting a document on the document tray 11 also means setting a document on the lift plate 8.

A document set sensor 16 is provided on the lift plate 8 of the document tray 11. The document set sensor 16 is, for example, an optical sensor. The document set sensor 16 has different output levels between when a document is set and when no document is set. The output of the document set sensor 16 is input to a conveyance control unit 10 (conveyance control circuit 10a), which will be described later. The conveyance control unit 10 (conveyance control circuit 10a) recognizes whether there is a document set on the document tray 11 (lift plate 8). When the conveyance control unit 10 recognizes that a document has been set, the conveyance control unit 10 notifies the main control unit 2 of the fact. Also, when the conveyance control unit 10 recognizes that the document has disappeared from the document tray 11, the conveyance control unit 10 notifies the main control unit 2 of the fact.

When reading is executed in a state where a document is set on the document tray 11 (in the case of the conveyance reading), the main control unit 2 issues an instruction to convey the document, to the conveyance control unit 10. Based on the instruction, the conveyance control unit 10 controls the operation of the document feeder 1.

A rotation shaft 80 is provided at an upstream end portion of the lift plate 8 in the document conveyance direction. The document feeder 1 includes a lift motor 81. The lift motor 81 is a motor for raising and lowering the lift plate 8. The lift motor 81 rotates the rotation shaft 80. In response to the rotation of the lift motor 81, the end portion of the lift plate 8 on the downstream side in the document conveyance direction moves up or down. Alternatively, a lifting member may be provided below the lift plate 8. The lifting member includes a shaft and a lifting plate attached to the shaft. The shaft is rotatably supported. The axial direction of the shaft is a direction perpendicular to the document conveyance direction. The lift motor 81 may rotate the shaft. When the lift motor 81 rotates in one direction, the shaft rotates in the direction in which the lifting plate lifts the lift plate 8 from below. When the lift motor 81 rotates in the other direction, the shaft rotates in the direction in which the lifting plate lowers the lift plate 8. As described above, the lift plate 8 may be moved up and down by using the lifting member.

The upper limit detection sensor 82 is a sensor for detecting that the lift plate 8 has risen to the upper limit position. The pickup roller 12 is provided above the lift plate 8. The pickup roller 12 is swingable in the up-down direction. A support member 12b that swingably supports the pickup roller 12 is provided. For example, the support member 12b is hooked on the rotation shaft of a second sheet feeding roller 72.

The upper limit detection sensor 82 is, for example, a transmission type optical sensor. When the lift plate 8 rises, the set document comes in contact with the pickup roller 12. Further, when the lift plate 8 continues to rise, the pickup roller 12 is also lifted together with the document. When the pickup roller 12 is lifted up to the upper limit, a projection provided on the support member 12b blocks the optical path of the upper limit detection sensor 82 from light. The upper limit detection sensor 82 changes its output level depending on whether the lift plate 8 (pickup roller 12) is positioned at the upper limit position. The output of the upper limit detection sensor 82 is input to the conveyance control unit 10. Based on the output of the upper limit detection sensor 82, the conveyance control unit 10 recognizes whether the lift plate 8 (pickup roller 12) is positioned at the upper limit position.

The separation conveyance unit 7 includes a first sheet feeding roller 71, the second sheet feeding roller 72, a sheet feeding belt 73, and a retard roller 70. The sheet feeding belt 73 is wound around the first sheet feeding roller 71 and the second sheet feeding roller 72. The conveyance control unit 10 rotates the sheet feeding motor 17. As a result, the first sheet feeding roller 71 rotates, and the sheet feeding belt 73 rotates. The sheet feeding belt 73 feeds the document sent from the pickup roller 12 to the downstream side in the document conveyance direction.

When the sheet feeding motor 17 is a stepping motor, the conveyance control unit 10 inputs a pulse to the sheet feeding motor 17. The rotation angle of the sheet feeding motor 17 per pulse is fixed. Therefore, the pickup roller 12 feeds a document by a predetermined amount for each pulse. The first sheet feeding roller 71, the second sheet feeding roller 72, and the sheet feeding belt 73 convey a document by a predetermined amount for each pulse.

The retard roller 70 is provided on a lower side of the sheet feeding belt 73. Further, the retard roller 70 contacts the sheet feeding belt 73. The sheet feeding motor 17 also rotates the retard roller 70. The rotation direction of the retard roller 70 varies depending on modes (details will be described later).

The registration roller pair 13, the conveyance rollers 14a, 14b, and 14c, and the discharge roller pair 14d are provided along a document conveyance path 110. These convey a document. The document is finally discharged to the document discharge tray 15. The document conveyance motor 18 rotates the registration roller pair 13, the conveyance rollers 14a, 14b, and 14c, and the discharge roller pair 14d. At the time of the document conveyance, the conveyance control unit 10 rotates the document conveyance motor 18.

The registration roller pair 13 is provided on the downstream side of the sheet feeding belt 73 in the document conveyance direction. A feed sensor 19 is provided between the sheet feeding belt 73 (the first sheet feeding roller 71, the retard roller 70, and the pickup roller 12) and the registration roller pair 13. The feed sensor 19 is, for example, an optical sensor. The feed sensor 19 has different output levels when a document is detected or not.

The output of the feed sensor 19 is input to the conveyance control unit 10. The conveyance control unit 10 recognizes that the leading edge of a document has reached the feed sensor 19 (installation position of the feed sensor 19, detection area of the feed sensor 19), that a document is passing the feed sensor 19, and that the trailing edge of a document has passed the feed sensor 19, based on the output of the feed sensor 19.

The conveyance control unit 10 may control the rotation of the registration roller pair 13, based on the output of the feed sensor 19. For example, the conveyance control unit 10 keeps the registration roller pair 13 in a stopped state until a predetermined bending creation time has elapsed after recognizing that the leading edge of a document has reached the feed sensor 19. The leading edge of the document abuts on the registration roller pair 13 in the stopped state. While in the stopped state of the registration roller pair 13, the conveyance control unit 10 continues to convey the document by the first sheet feeding roller 71 (sheet feeding belt 73) and the pickup roller 12. As a result, the document is bent. The leading edge of the document is aligned with the nip of the registration roller pair 13 due to the elasticity of the bent document. This improves the skew of the document.

Further, a double feed detection sensor 111 is provided near the downstream side of the registration roller pair 13 in the document conveyance direction (between the registration roller pair 13 and the conveyance roller 14a). The double feed detection sensor 111 is, for example, an ultrasonic sensor. The double feed detection sensor 111 includes a transmitter and a receiver. The transmitter and the receiver are provided on either side of a document conveyed in the up-down direction. The transmitter emits an ultrasonic wave when a document is conveyed. When double feeding occurs, the level of the ultrasonic wave received by the receiver is lower than the level when only one document is conveyed. The output of the receiver is input to the conveyance control unit 10. The conveyance control unit 10 can determine whether double feeding has occurred, based on the magnitude of the output of the receiver.

The registration roller pair 13, the conveyance rollers 14a, 14b, and 14c, and the discharge roller pair 14d convey a document along the document conveyance path 110. The document is finally discharged to the document discharge tray 15. The document conveyance motor 18 rotates the registration roller pair 13, the conveyance rollers 14a, 14b, and 14c and the discharge roller pair 14d. During the document conveyance, the conveyance control unit 10 rotates the document conveyance motor 18.

(Driving of Each Roller)

Figure 4:
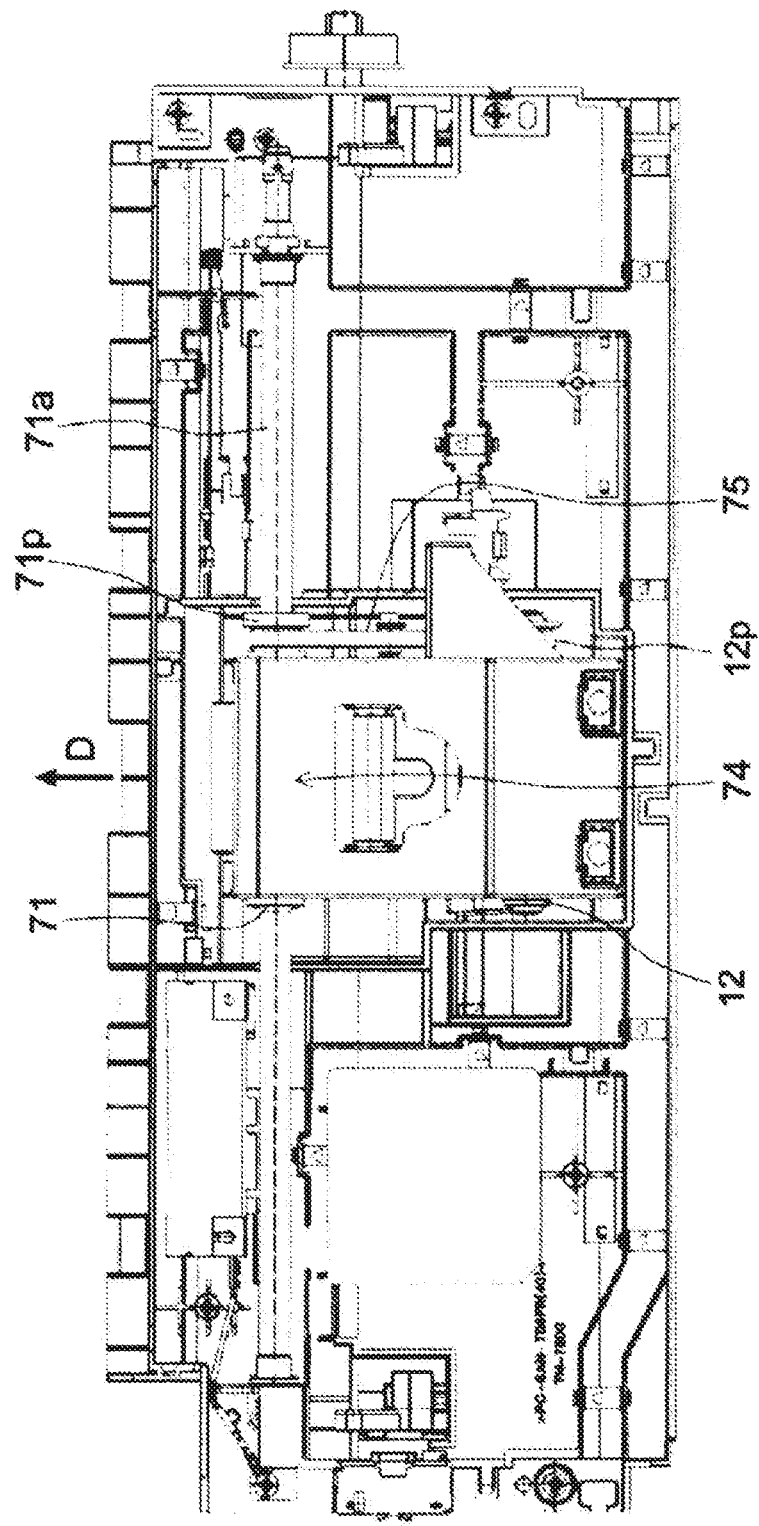
FIG. 4 shows an example of a diagram of the inside of the document feeder according to the embodiment as viewed from above.
Figure 5:
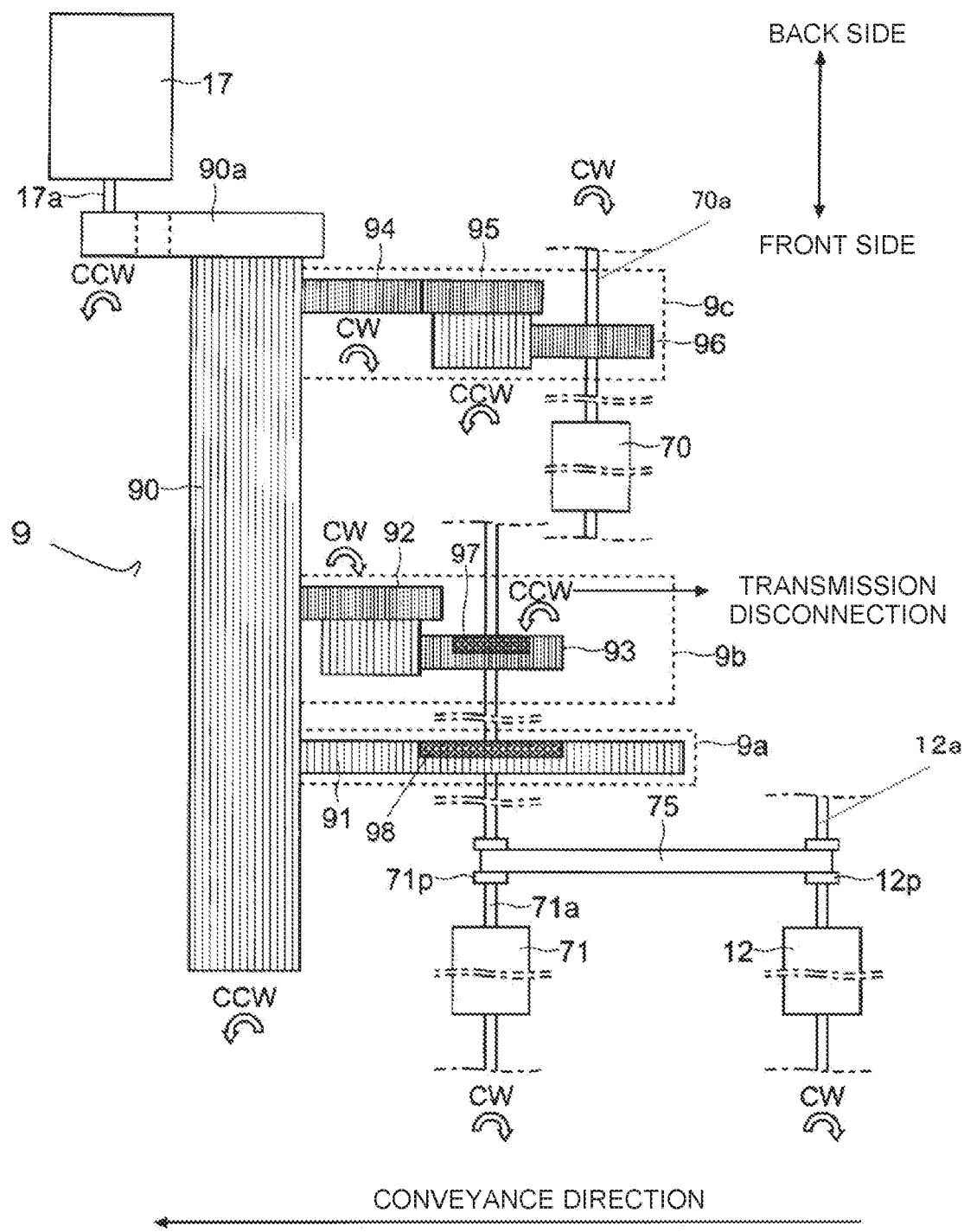
FIG. 5 is a diagram showing an example of driving transmission of a sheet feeding motor according to the embodiment.
Figure 6:
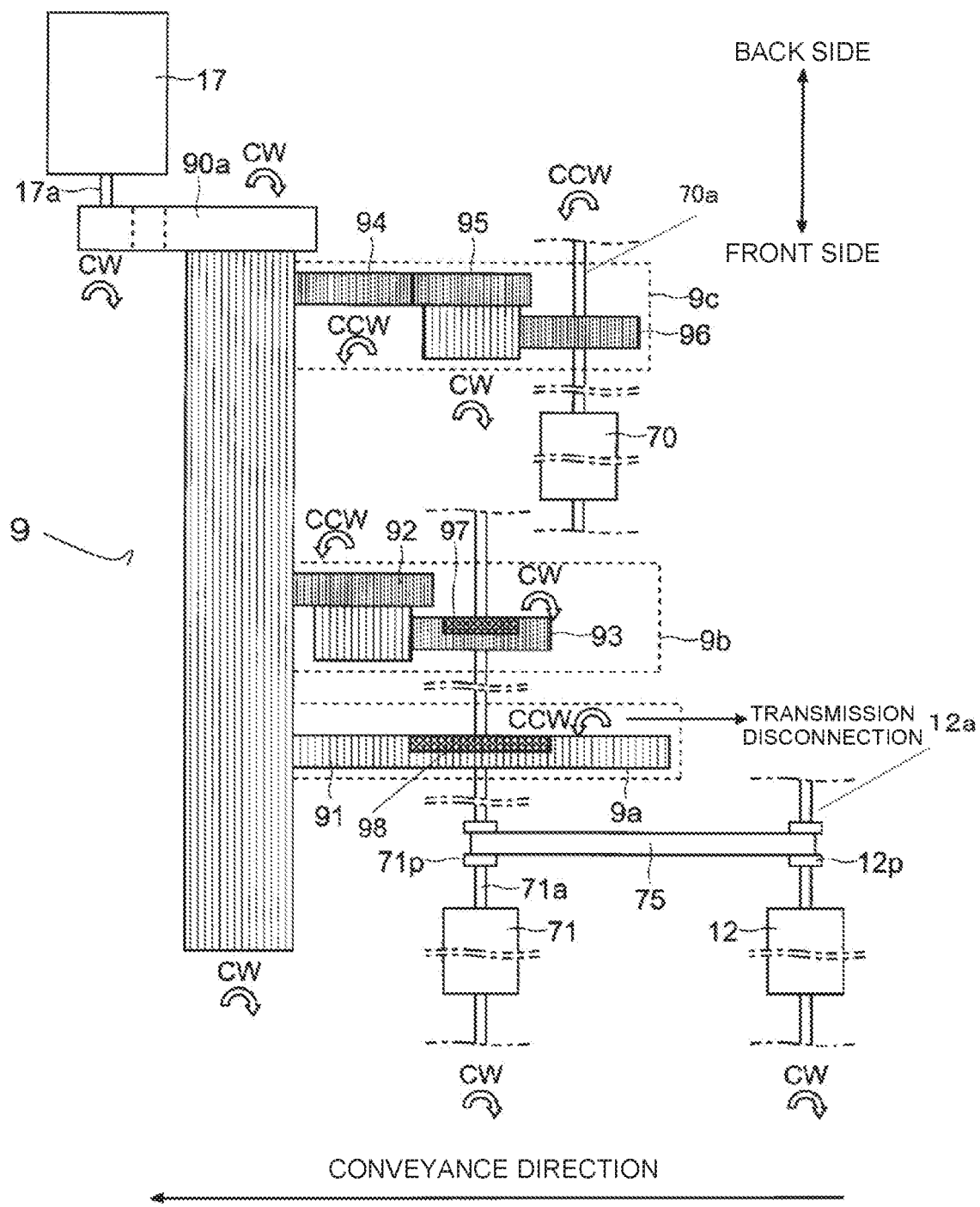
FIG. 6 is a diagram showing an example of driving transmission of the sheet feeding motor according to the embodiment.

Next, an example of driving of each roller in the document feeder 1 according to the embodiment will be described with reference to FIGS. 4 to 6. FIG. 4 shows an example of a diagram of the inside of the document feeder 1 according to the embodiment as viewed from above. FIGS. 5 and 6 are diagrams showing an example of the driving transmission of the sheet feeding motor 17 according to the embodiment.

The arrow D in FIG. 4 indicates the direction in which a document is conveyed. As shown in FIG. 4, the portion of the pickup roller 12 in contact with a document, and the sheet feeding belt 73 are located substantially in the center in the direction perpendicular to the document feeder 1. In FIG. 4, the portion of the pickup roller 12 in contact with a document, and the sheet feeding belt 73 are substantially invisible thanks to a cover 74. In FIG. 4, the first sheet feeding roller 71 includes a rotation shaft 71a extending in the direction perpendicular to the conveyance direction. The rotation shaft 71a is rotatably supported. The sheet feeding motor 17 rotates the rotation shaft 71a.

Further, a first pulley 71p is attached to the rotation shaft 71a. A second pulley 12p is attached to the pickup roller 12. An interlocking belt 75 is stretched around the pulleys.

When the rotation shaft 71a (first sheet feeding roller 71) rotates, the interlocking belt 75 rotates. The pickup roller 12 also rotates in conjunction therewith.

In the document feeder 1, the sheet feeding motor 17 rotates the pickup roller 12, the first sheet feeding roller 71, the second sheet feeding roller 72, the sheet feeding belt 73, and the retard roller 70. The sheet feeding motor 17 can rotate in both a first direction (forward direction) and a second direction (reverse direction). In order to rotate the pickup roller 12, the first sheet feeding roller 71, the second sheet feeding roller 72, the sheet feeding belt 73, and the retard roller 70, the document feeder 1 includes a drive mechanism 9.

The drive mechanism 9 includes a first drive mechanism 9a, a second drive mechanism 9b, and a third drive mechanism 9c. The first drive mechanism 9a, the second drive mechanism 9b, and the third drive mechanism 9c transmit the driving of the sheet feeding motor 17.

FIGS. 5 and 6 are diagrams showing an example of gears included in each drive mechanism 9. In FIGS. 5 and 6, the rectangle at the upper left corner indicates the sheet feeding motor 17. A motor gear is attached to the rotation shaft 17a of the sheet feeding motor 17. A transmission belt 90a is wound around an end of a base gear 90 and the motor gear. When the motor gear (the sheet feeding motor 17) rotates, the base gear 90 rotates. In FIGS. 5 and 6, the base gear 90 is illustrated in a large scale for convenience. The base gear 90 is connected to the first drive mechanism 9a, the second drive mechanism 9b, and the third drive mechanism 9c.

Specifically, the first drive mechanism 9a is a mechanism for rotating the first sheet feeding roller 71 and the pickup roller 12. The first drive mechanism 9a includes a first gear 91. The first gear 91 is attached to the rotation shaft 71a of the first sheet feeding roller 71. The first gear 91 meshes with the base gear 90. Therefore, when the sheet feeding motor 17 rotates, the first drive mechanism 9a rotates the first sheet feeding roller 71.

As described above, the first pulley 71p is provided on the rotation shaft 71a of the first sheet feeding roller 71. The second pulley 12p is provided on the rotation shaft 12a of the pickup roller 12. The pickup roller 12 rotates in accordance with the first sheet feeding roller 71, by the interlocking belt 75 wound around the first pulley 71p and the second pulley 12p.

The second drive mechanism 9b is also a mechanism for rotating the first sheet feeding roller 71 and the pickup roller 12. The second drive mechanism 9b includes a second gear 92 and a third gear 93. The second gear 92 meshes with the base gear 90. The third gear 93 meshes with the second gear 92. The third gear 93 is attached to the rotation shaft 71a of the first sheet feeding roller 71. When the sheet feeding motor 17 rotates, the second drive mechanism 9b rotates the first sheet feeding roller 71.

The third drive mechanism 9c is also a mechanism for rotating the retard roller 70. The third drive mechanism 9c includes a fourth gear 94, a fifth gear 95, and a sixth gear 96. The base gear 90 meshes with the fourth gear 94. The fourth gear 94 meshes with the fifth gear 95. The fifth gear 95 meshes with the sixth gear 96. The sixth gear 96 is attached to the rotation shaft 70a of the retard roller 70. When the sheet feeding motor 17 rotates, the third drive mechanism 9c rotates the retard roller 70.

Both of the first drive mechanism 9a and the second drive mechanism 9b are mechanisms for rotating the first sheet feeding roller 71 and the pickup roller 12 to feed a document in the document conveyance direction. The third drive mechanism 9c is also a mechanism that switches the rotation direction of the retard roller 70 in accordance with the rotation direction of the sheet feeding motor 17.

1. In Case of Rotating the Sheet Feeding Motor 17 in the Forward Direction.

An example of drive transmission when the sheet feeding motor 17 is rotated in the first direction (forward direction) will be described with reference to FIG. 5. In FIG. 5, the left indicates the conveyance direction of a document. The lower side in FIG. 5 corresponds to the front side of the document feeder 1, and the upper side in FIG. 5 corresponds to the back side of the document feeder 1.

In the example of FIG. 5, a counter-clockwise (CCW) direction is the first direction. When the sheet feeding motor 17 rotates in the first direction, the base gear 90 also rotates in the CCW direction.

When the base gear 90 rotates in the CCW direction, the first gear 91 of the first drive mechanism 9a rotates in a clockwise (CW) direction. As a result, the first sheet feeding roller 71 and the pickup roller 12 also rotate in the CW direction. The CW direction is a direction in which the first sheet feeding roller 71, the second sheet feeding roller 72, the sheet feeding belt 73, and the pickup roller 12 rotate so as to feed a document toward the downstream side in the document conveyance direction. In this case, the first gear 91 rotates the rotation shaft 71a of the first sheet feeding roller 71 in the CW direction.

When the base gear 90 rotates in the CCW direction, the second gear 92 of the second drive mechanism 9b rotates in the CW direction. The third gear 93 of the second drive mechanism 9b meshing with the second gear 92 rotates in the CCW direction. The third gear 93 attempts to rotate the rotation shaft 71a of the first sheet feeding roller 71 in the CCW direction.

Here, the third gear 93 incorporates a first one-way clutch 97. The first one-way clutch 97 does not transmit torque to the rotation shaft 71a when the third gear 93 attempts to rotate in the CCW direction. When the sheet feeding motor 17 is rotated in the first direction (forward direction), the transmission of the driving force by the second drive mechanism 9b is cut off by the first one-way clutch 97.

When the base gear 90 rotates in the CCW direction, the fourth gear 94 of the third drive mechanism 9c rotates in the CW direction. The fifth gear 95 of the third drive mechanism 9c meshing with the fourth gear 94 rotates in the CCW direction. The sixth gear 96 of the third drive mechanism 9c meshing with the fifth gear 95 rotates in the CW direction. The sixth gear 96 rotates the rotation shaft 70a of the retard roller 70 in the CW direction.

The retard roller 70 faces the sheet feeding belt 73 (see FIG. 2). Therefore, in this case, the retard roller 70 rotates so as to feed a document back in the opposite direction (upstream side) to the document conveyance direction. That is, when the sheet feeding motor 17 is rotated in the first direction, the third drive mechanism 9c rotates the retard roller 70 to feed the document to the upstream side in the document conveyance direction.

2. In Case of Rotating the Sheet Feeding Motor 17 in the Reverse Direction.

An example of driving transmission when the sheet feeding motor 17 is rotated in the second direction (reverse direction) will be described with reference to FIG. 6. In FIG. 6, the left direction indicates the conveyance direction of a document. The lower side in FIG. 6 corresponds to the front side of the document feeder 1, and the upper side in FIG. 6 corresponds to the back side of the document feeder 1.

In the example of FIG. 6, the CW direction is the second direction. When the sheet feeding motor 17 is rotated in the second direction, the base gear 90 also rotates in the CW direction. When the base gear 90 rotates in the CW direction, the first gear 91 of the first drive mechanism 9*a* rotates in the CCW direction. The first gear 91 attempts to rotate the rotation shaft 71*a* of the first sheet feeding roller 71 in the CCW direction.

Here, the first gear 91 incorporates a second one-way clutch 98. The second one-way clutch 98 does not transmit torque to the rotation shaft 71*a* when the first gear 91 (the rotation shaft 71*a* of the first sheet feeding roller 71) attempts to rotate in the CCW direction. When the sheet feeding motor 17 is rotated in the second direction (reverse direction), the transmission of the driving force in the first drive mechanism 9*a* is cut off by the second one-way clutch 98.

When the base gear 90 rotates in the CW direction, the second gear 92 of the second drive mechanism 9*b* rotates in the CCW direction. The third gear 93 of the second drive mechanism 9*b* meshing with the second gear 92 rotates in the CW direction. The third gear 93 attempts to rotate the rotation shaft 71*a* of the first sheet feeding roller 71 in the CW direction. In this case, the first one-way clutch 97 of the third gear 93 transmits torque to the rotation shaft 71a. When the sheet feeding motor 17 is rotated in the second direction (reverse direction), the third gear 93 of the second drive mechanism 9*b* rotates the rotation shaft 71*a* of the first sheet feeding roller 71 in the CW direction.

As a result, the first sheet feeding roller 71 and the pickup roller 12 also rotate in the CW direction. The CW direction is a direction in which the first sheet feeding roller 71, the second sheet feeding roller 72, the sheet feeding belt 73, and the pickup roller 12 rotate to feed a document in the document conveyance direction.

When the base gear 90 rotates in the CW direction, the fourth gear 94 of the third drive mechanism 9*c* rotates in the CCW direction. The fifth gear 95 of the third drive mechanism 9*c* meshing with the fourth gear 94 rotates in the CW direction. The sixth gear 96 of the third drive mechanism 9*c* meshing with the fifth gear 95 rotates in the CCW direction. The sixth gear 96 rotates the rotation shaft 70*a* of the retard roller 70 in the CCW direction.

The retard roller 70 faces the sheet feeding belt 73 (see FIG. 2). The CCW direction is a direction in which the retard roller 70 rotates to feed a document in the document conveyance direction. That is, when the sheet feeding motor 17 is rotated in the second direction, the retard roller 70 rotates to feed a document in the document conveyance direction.

The summary of the directions in which the sheet feeding motor 17 feeds a document is as follows.
(1) When the Sheet Feeding Motor 17 Rotates in the First Direction (Forward Direction).

The pickup roller 12, the first sheet feeding roller 71, the second sheet feeding roller 72, and the sheet feeding belt 73 rotate to feed a document in the document conveyance direction (downstream direction)

The retard roller 70 rotates to feed back a document to the upstream direction in the document conveyance direction (reverse direction to the document conveyance direction)
(2) When the Sheet Feeding Motor 17 Rotates in the Second Direction (Reverse Direction)

The pickup roller 12, the first sheet feeding roller 71, the second sheet feeding roller 72, and the sheet feeding belt 73 rotate to feed a document in the document conveyance direction (downstream direction).

The retard roller 70 rotates to feed a document to the downstream side in the document conveyance direction.

As described above, in the document feeder 1, regardless of the rotation direction of the sheet feeding motor 17, the pickup roller 12, the first sheet feeding roller 71, the second sheet feeding roller 72, and the sheet feeding belt 73 rotate to feed a document to the downstream side in the document conveyance direction. The retard roller 70 changes its rotation direction according to the rotation direction of the sheet feeding motor 17.

(Selection of Read Mode)

Next, an overview of the selection of a read mode will be described. In the multifunction peripheral 100 (document feeder 1), it is possible to select one of a normal mode and a manual feed mode as a mode used for feeding and reading a document (conveyance reading). For example, the mode can be selected by the operation panel 5.

The normal mode is a mode in which the retard roller 70 is rotated to feed a document in the direction opposite to the document conveyance direction (the direction in which the document is fed back). That is, the normal mode is a mode for conveying a document while separating (sorting) overlapped documents. The manual feed mode is a mode in which the retard roller 70 is rotated to feed a document to the downstream side in the document conveyance direction (the direction feeding in the conveyance direction). The manual feed mode is a mode in which a document is conveyed without being separated.

There is one document in which a plurality of sheets are stacked. For example, in a slip for Takkyubin (registered trademark), a carbon paper for transfer is attached to a mount. In addition, there is a case where a document to which a peelable paper such as a sticky note is attached is desired to be read. The retard roller 70 separates the document overlapped by the friction between the surface thereof and the document. When a document to which a slip or a sticky note is attached is rubbed by the retard roller 70, a force is applied to the document. As a result, the stuck sheet (paper) may be peeled off. Further, it may be preferable not to rub, by the retard roller 70, a document with a perforation for cutting out. When a user does not want the retard roller 70 to execute the separating operation for a document, the user can use the manual feed mode.

(Conveyance Reading in Normal Mode)

Figure 7:
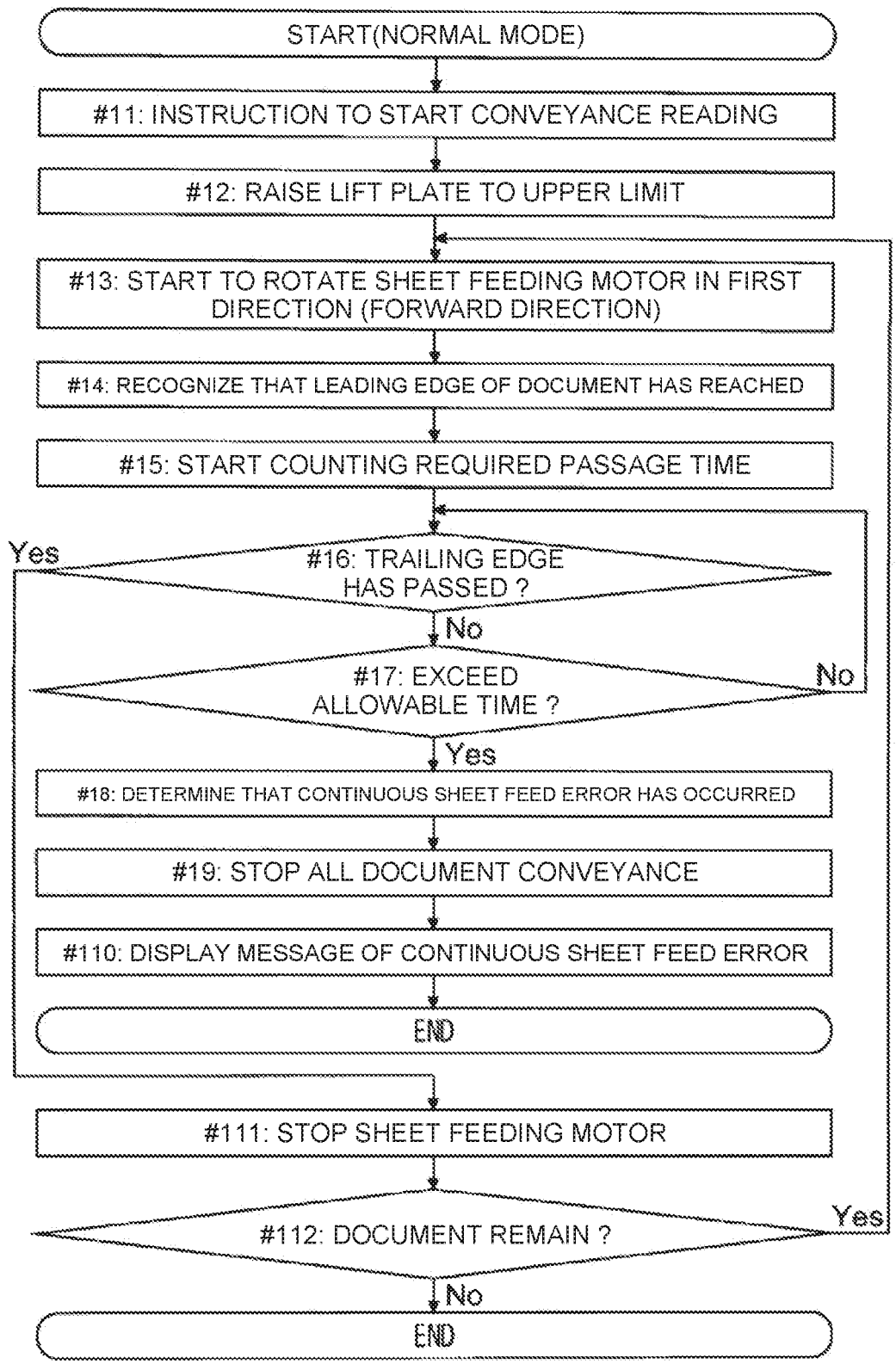
FIG. 7 is a diagram showing an example of the flow of conveyance reading in a normal mode according to the embodiment.

Next, an example of the flow of the conveyance reading in the normal mode according to the embodiment will be described with reference to FIG. 7. FIG. 7 is a diagram showing an example of the flow of the conveyance reading in the normal mode according to the embodiment.

The START in FIG. 7 indicates the time when the operation panel 5 receives the selection of the normal mode and also receives the instruction to start a job accompanied with reading. For example, the operation panel 5 receives an operation of the start button as a start instruction. Note that a job such as copy and scan transmission is the job accompanied with reading. Because of the conveyance reading, a user sets a document on the document tray 11 before the start instruction. The conveyance control unit 10 and the main control unit 2 recognize the document set, based on the output of the document set sensor 16.

First, the main control unit 2 instructs the conveyance control unit 10 to start the conveyance reading in the normal mode (step #11). Upon receiving the instruction, the conveyance control unit 10 causes the lift motor 81 to raise the lift plate 8 to the upper limit (step #12). After the lift plate 8 starts rising, when the conveyance control unit 10 recognizes that the lift plate 8 (pickup roller 12) has reached to the upper limit based on the output of the upper limit detection sensor 82, the conveyance control unit 10 stops the lift motor 81.

Note that the document feeder 1 includes a lower limit detection sensor 112 that detects that the lift plate 8 is located at the lower limit. For example, the lower limit detection sensor 112 is a switch that contacts a bottom surface of the lift plate 8. An output of the lower limit detection sensor 112 is input to the conveyance control unit 10. The conveyance control unit 10 recognizes that the lift plate 8 has fallen to the lower limit, based on the output of the lower limit detection sensor 112. Before starting the job, the conveyance control unit 10 lowers the lift plate 8 to the lower limit. For example, when the conveyance control unit 10 recognizes that there is no document set while the lift plate 8 is not positioned at the lower limit, the conveyance control unit 10 rotates the lift motor 81 to lower the lift plate 8 to the lower limit.

After the lift plate 8 starts rising, the conveyance control unit 10 starts to rotate the sheet feeding motor 17 in the first direction (forward direction) (step #13). Accordingly, the pickup roller 12, the first sheet feeding roller 71, the second sheet feeding roller 72, and the sheet feeding belt 73 rotate to feed the document in the document conveyance direction. The document feeding is started. The retard roller 70 rotates to feed back the document in the direction opposite to the document conveyance direction.

Note that the retard roller 70 incorporates a torque limiter. When only one document is sent, the rotational load exceeds the torque set by the torque limiter. As a result, the retard roller 70 is driven by the sheet feeding belt 73. That is, the rotation direction of the retard roller 70 is the document conveyance direction.

The conveyance control unit 10 recognizes that the leading edge of the document has reached the feed sensor 19, based on the output of the feed sensor 19, (step #14). Then, the conveyance control unit 10 starts measuring a required passage time T9 (step #15). Specifically, the required passage time T9 is a time until the recognition that the trailing edge of the document has passed the feed sensor 19, after the recognition that the leading edge of the document has reached the feed sensor 19.

The conveyance control unit 10 confirms whether the trailing edge of the document has passed the feed sensor 19 (step #16). When the trailing edge of the document has not passed the feed sensor 19 (No in step #16), the conveyance control unit 10 confirms whether the required passage time T9 being measured exceeds a predetermined allowable time (step #17). The allowable time is determined in advance according to the document size. The allowable time is a time for determining whether a continuous sheet feed error has occurred.

The allowable time is a time obtained by adding a predetermined margin to the time obtained by dividing the length of one document in the conveyance direction by an ideal conveyance speed of the document (on the specification). When a continuous sheet feeding occurs, the trailing edge portion of the preceding document and the leading edge portion of the following document are conveyed in an overlapping state. In this case, the feed sensor 19 cannot detect the passage of the trailing edge of the preceding document even though the trailing edge of the preceding document has passed through the feed sensor 19.

Note that the operation panel 5 receives the setting for the document size. Based on the setting, the conveyance control unit 10 may recognize the length of one document sheet in the conveyance direction. Further, a document size sensor for detecting the length of the document in the conveyance direction may be provided on the document tray 11. In this case, the conveyance control unit 10 recognizes the length of the document in the conveyance direction on the basis of the output of the document size sensor.

When the required passage time T9 does not exceed the allowable time (No in step #17), the conveyance control unit 10 executes step #16 (return to step #16). When the required passage time T9 exceeds the allowable time (Yes in step #17), the conveyance control unit 10 determines that a continuous sheet feed error has occurred (step #18). When detection of the passage of the trailing edge takes too long, the conveyance control unit 10 determines that the continuous sheet feed error has occurred. Then, the conveyance control unit 10 stops all the conveyance for the document (step #19). In other words, the conveyance control unit 10 stops all of the document conveyance motors in the document feeder 1. Then, the conveyance control unit 10 causes the display panel 51 to display a message indicating that the continuous sheet feed error has occurred (step #110). Thereafter, the conveyance control unit 10 ends the flowchart (END). When the user desires to start over, the user restarts from setting the document.

On the other hand, when the conveyance control unit 10 recognizes that the trailing edge of the document has passed the feed sensor 19 (Yes in step #16), the conveyance control unit 10 stops the sheet feeding motor 17 (step #111). That is, the conveyance control unit 10 stops the pickup roller 12, the first sheet feeding roller 71, the second sheet feeding roller 72, the sheet feeding belt 73, and the retard roller 70.

The conveyance control unit 10 conveys the document that has passed through the feed sensor 19 to the discharge tray 15. The image reading device 4 reads the document to be conveyed. Then, the conveyance control unit 10 confirms whether the document remains on the document tray 11 (lift plate 8) (step #112). When no document remains on the document tray 11 (No in step #112), the conveyance control unit 10 ends the flowchart (END). When the document remains on the document tray 11, the conveyance control unit 10 starts step #13 after a predetermined period of a sheet interval elapses (return to step #13).

(Conveyance Reading in Single-Sheet Read Mode)

Figure 8:
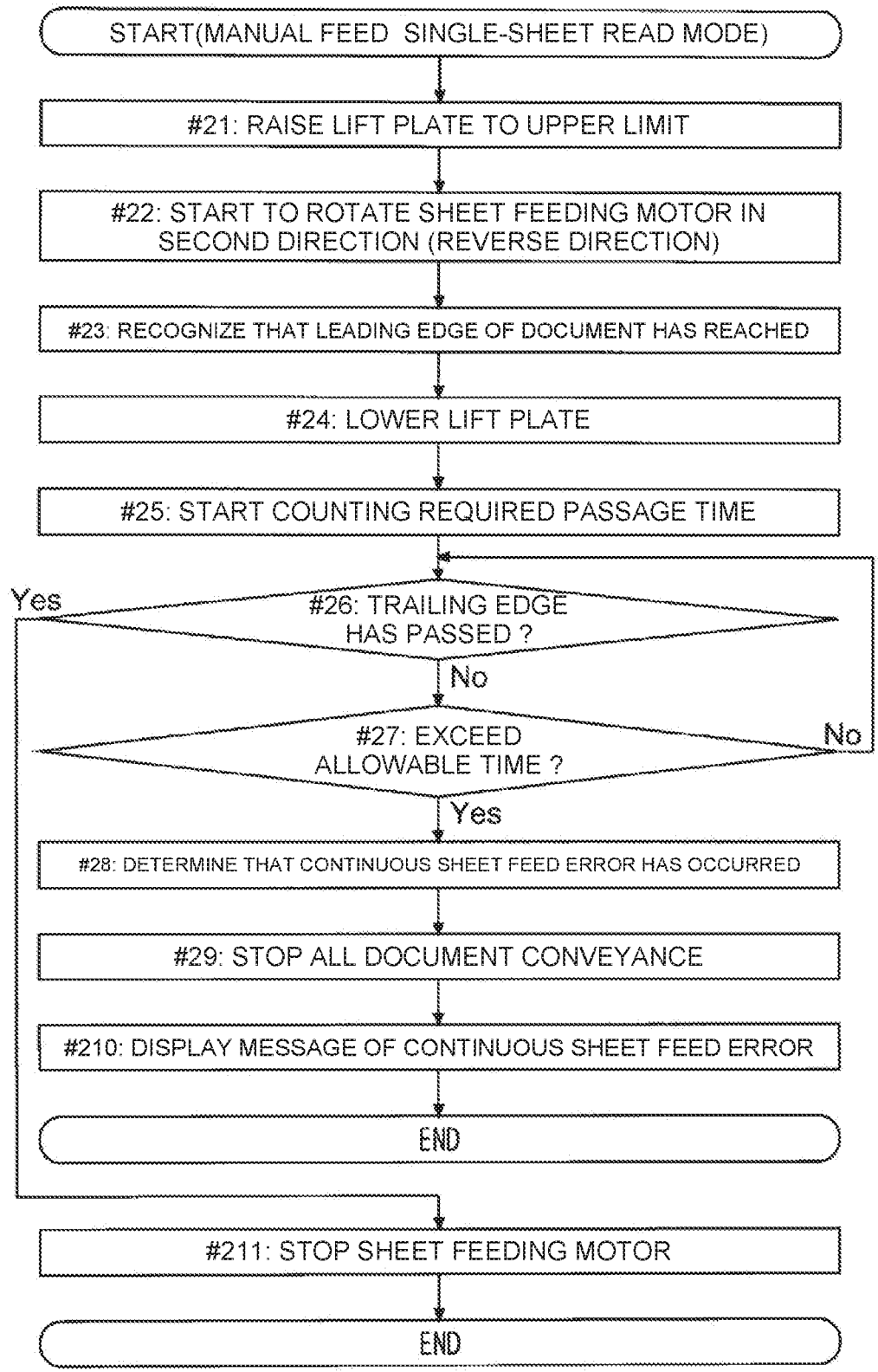
FIG. 8 is a diagram showing an example of the flow of conveyance reading in a single-sheet read mode according to the embodiment.

Next, an example of the flow of the conveyance reading in a single-sheet read mode in the manual feed mode according to the embodiment will be described with reference to FIG. 8. FIG. 8 is a diagram showing an example of the flow of the conveyance reading in the single-sheet read mode according to the embodiment.

The multifunction peripheral 100 (document feeder 1) can use two modes as the manual feed mode. One of the manual feed modes is the single-sheet read mode. The other is a continuous read mode. The single-sheet read mode is a mode for reading documents one by one. The continuous read mode is a mode for continuously and automatically reading a plurality of documents in the manual feed mode.

In the following description, an example of the flow of the conveyance reading in the single-sheet read mode will be described with reference to FIG. 8. After the single-sheet read mode is described, an example of the flow of the conveyance reading in the continuous read mode will be described.

The START in FIG. 8 indicates a time when the operation panel 5 receives a start instruction for a job accompanied with reading in a state where the single-sheet read mode is selected. For example, the operation panel 5 receives an operation of the start button as a start instruction. The user sets a document on the document tray 11 before issuing the start instruction. A plurality of documents may be set on the document tray 11. The conveyance control unit 10 and the main control unit 2 recognize the document set, based on the output of the document set sensor 16.

First, when starting the conveyance reading in the single-sheet read mode of the manual feed mode, the conveyance control unit 10 cause the lift motor 81 to raise the lift plate 8 to the upper limit (step #21). This point is the same as that in the normal mode. After the lift plate 8 starts to rise, the conveyance control unit 10 starts to rotate the sheet feeding motor 17 in the second direction (reverse direction) (step #22). Accordingly, the pickup roller 12, the first sheet feeding roller 71, the second sheet feeding roller 72, and the sheet feeding belt 73 rotate to feed the document to the downstream side in the document conveyance direction. The retard roller 70 also rotates to feed the document to the downstream side in the document conveyance direction.

In the manual feed mode (both the single-sheet read mode and the continuous read mode), the conveyance control unit 10 reduces the conveyance speed for the document in comparison with the normal mode. For example, the conveyance control unit 10 sets the conveyance speed in the manual feed mode to approximately ½ of the conveyance speed in the normal mode. The conveyance control unit 10 may change the rotation speed of the sheet feeding motor 17 in the normal mode from the rotation speed of the sheet feeding motor 17 in the manual feed mode.

Further, the conveyance control unit 10 may rotate the sheet feeding motor 17 in the manual feed mode and the normal mode at the same speed. In this case, the number of teeth of the gear included in the first drive mechanism 9a and the number of teeth of the gear included in the second drive mechanism 9b are set so that the conveyance speed in the manual feed mode becomes approximately ½ of the conveyance speed in the normal mode.

The conveyance control unit 10 recognizes that the leading edge of the document has reached the feed sensor 19, based on the output of the feed sensor 19 (step #23). Then, the conveyance control unit 10 causes the lift motor 81 to lower the lift plate 8 by a predetermined lowering amount (step #24).

That is, the conveyance control unit 10 causes the lift motor 81 to start lowering the lift plate 8 while the pickup roller 12 is feeding the document. After start lowering, the pickup roller 12 does not come into contact with the document. Further, immediately after the fed document has passed the pickup roller 12, the next document is not conveyed even if the pickup roller 12 does not stop. That is, even if the retard roller 70 feeds the document in the conveyance direction, the continuous sheet feed error is less likely to occur.

After the sheet feeding motor 17 (pickup roller 12) starts to rotate, and before the feed sensor 19 recognizes that the leading edge of the document has reached, the conveyance control unit 10 may start lowering the lift plate 8. When the document is gripped by the nip between the retard roller 70 and the sheet feeding belt 73, the document is conveyed even if the pickup roller 12 does not contact the document. Therefore, the conveyance control unit 10 may cause the lift motor 81 to start lowering the lift plate 8 after a predetermined waiting time elapses after the pickup roller 12 starts rotating. In this case, the waiting time is a time that can be obtained by dividing the distance from the pickup roller 12 (the portion where the pickup roller 12 contacts the document) to the retard roller 70 (the nip between the retard roller 70 and the sheet feeding belt 73) by the ideal document conveyance speed.

Further, the sheet feeding motor 17 rotates the pickup roller 12. A stepping motor can be used for the sheet feeding motor 17. When the stepping motor is used, the rotation amount of the sheet feeding motor 17 and the pickup roller 12 per pulse is determined. Therefore, when the conveyance control unit 10 inputs pulses to the sheet feeding motor 17 by a predetermined number of lowering start pulses since the pickup roller 12 starts to rotate, the conveyance control unit 10 may cause the lift motor 81 to start lowering the lift plate 8. In this case, the number of lowering start pulses is a value obtained by dividing the distance from the pickup roller to the retard roller by the movement amount of a document per pulse. When the obtained value is not an integer, the value below the decimal point may be rounded up.

The movement amount of the document per pulse is predetermined. The movement amount of the document per pulse may be the movement amount of the peripheral surface of the pickup roller 12 when one pulse is input to the sheet feeding motor 17. In consideration of some slip, the movement amount of the document per pulse may be a value obtained by subtracting a margin from the movement amount of the peripheral surface of the pickup roller 12 when one pulse is input to the sheet feeding motor 17.

When the lift plate 8 is lowered by the predetermined lowering amount, the conveyance control unit 10 stops the lift motor 81. The predetermined lowering amount may be, for example, a length in a range of 10 mm to 20 mm For example, the lowering amount may be about 15 mm For example, when the lift motor 81 is a stepping motor, the conveyance control unit 10 inputs a predetermined number of pulses to the lift motor 81. The predetermined number of pulses is the number of pulses by which the lift plate 8 lowers by the predetermined lowering amount. The lowering amount is the amount of change in the height of the edge of the upper surface of the lift plate 8 on the downstream side in the document conveyance direction.

The lowering amount can be set so that the distance from the lower end of the peripheral surface of the pickup roller 12 to the document immediately below the uppermost document is equal to or greater than a predetermined separation distance. That is, the document is firmly separated from the lower end of the peripheral surface of the pickup roller 12. The lowering amount is set to be a value at which the document on the lift plate 8 does not fall below a predetermined lower limit height. The document is prevented from hanging too much.

When the conveyance control unit 10 recognizes that the leading edge of the document has reached the feed sensor 19, the conveyance control unit 10 starts measuring the required passage time T9 (step #25). The required passage time T9 is a time until the conveyance control unit 10 recognizes that the trailing edge of the document has passed the feed sensor 19 after the conveyance control unit 10 recognizes that the leading edge of the document has reached the feed sensor 19.

The conveyance control unit 10 confirms whether the trailing edge of the document has passed the feed sensor 19 (step #26). When the trailing edge of the document has not passed the feed sensor 19 (No in step #26), the conveyance control unit 10 determines whether the required passage time T9 being measured exceeds the allowable time (step #27). Note that, since the conveyance speed is approximately ½, the allowable time in the manual feed mode is approximately twice as large as that in the normal mode.

When the required passage time T9 does not exceed the allowable time (No in step #27), the conveyance control unit 10 executes step #26 (return to step #26). When the required passage time T9 exceeds the allowable time (Yes in step #27), the conveyance control unit 10 determines that a continuous sheet feed error has occurred (step #28). When the detection of the passage of the trailing edge of the document is delayed, the conveyance control unit 10 determines that the continuous sheet feed error has occurred. Then, the conveyance control unit 10 stops all the conveyance for the document (step #29). In other words, the conveyance control unit 10 stops all of the document conveyance motors in the document feeder 1. Then, the conveyance control unit 10 causes the display panel 51 to display a message indicating that a continuous sheet feed error has occurred (step #210). Thereafter, the conveyance control unit 10 ends the flowchart (END). When the user desires to start over, the user restarts from setting the document.

On the other hand, when the conveyance control unit 10 recognizes that the trailing edge has passed (Yes in step #26), the conveyance control unit 10 stops the sheet feeding motor 17 (step #211). That is, the conveyance control unit 10 stops the pickup roller 12, the first sheet feeding roller 71, the second sheet feeding roller 72, the sheet feeding belt 73, and the retard roller 70. The conveyance control unit 10 conveys the document that has passed through the feed sensor 19 to the discharge tray 15. The image reading device 4 reads a document to be conveyed. Then, the conveyance control unit 10 ends the flowchart (END).

The single-sheet read mode is a mode for instructing to start a job for each document (operating the start button), and considering reading documents one by one. Note that a plurality of documents may be set in the document tray 11 even in the single-sheet read mode. When the user subsequently desires to read in the single-sheet read mode, the user issues an instruction to start the job again. Thereby, the flowchart in FIG. 8 starts again.

(Operation Flow in Continuous Read Mode)

Figure 9:
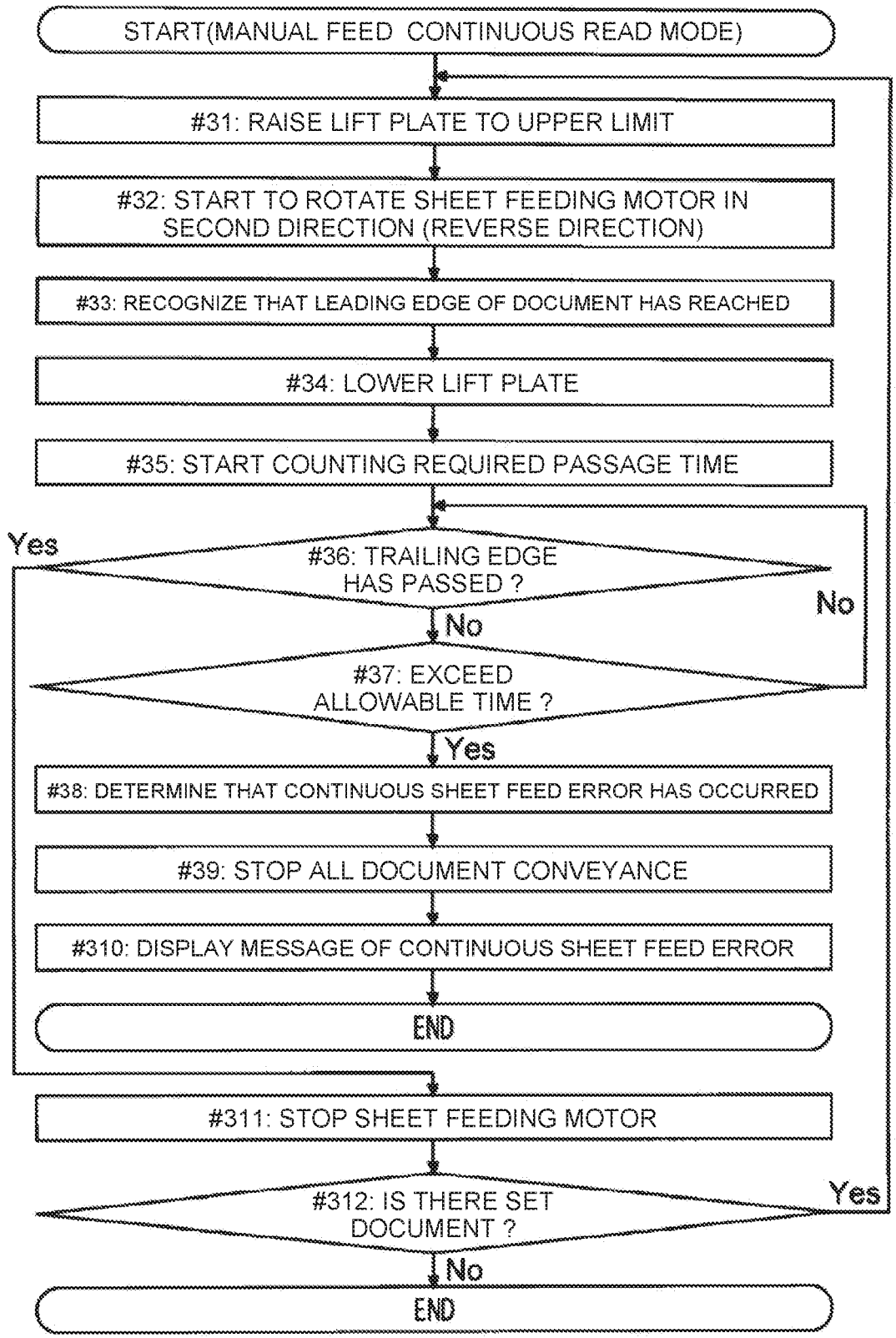
FIG. 9 is a diagram showing an example of the flow of conveyance reading in a continuous read mode according to the embodiment.

Next, an example of the flow of the conveyance reading in the continuous read mode according to the embodiment will be described with reference to FIG. 9. FIG. 9 is a diagram showing an example of the flow of the conveyance reading in the continuous read mode according to the embodiment.

The START in FIG. 9 indicates a time when the operation panel 5 receives a start instruction for a job accompanied with reading (operation of the start button) in a state where the continuous read mode is selected. The user sets a document on the document tray 11 before issuing the start instruction. In the continuous read mode, a plurality of documents are set. The conveyance control unit 10 and the main control unit 2 recognize the document set, based on the output of the document set sensor 16.

First, when starting the conveyance reading in the continuous read mode of the manual feed mode, the conveyance control unit 10 cause the lift motor 81 to raise the lift plate 8 to the upper limit (step #31). This point is the same as those in the normal mode and the single-sheet read mode.

Steps #32 to #311 in the continuous read mode (FIG. 9) are the same as steps #22 to #211 in the single-sheet read mode (FIG. 8). Therefore, the description of steps #32 to #311 adopts the description of steps #22 to #211, and the description thereof is omitted.

When the conveyance control unit 10 recognizes that the trailing edge of the document has passed the feed sensor 19 (Yes in step #36), and stops the sheet feeding motor 17 (step #311), the conveyance control unit 10 confirms whether there is a document set on the lift plate 8 (document tray 11) (step #312). Specifically, the conveyance control unit 10 confirms the output of the document set sensor 16.

When there is no document set (No in step #312), the conveyance control unit 10 ends the flowchart (END). When there is a document set (Yes in step #312), the conveyance control unit 10 executes step #31 (returns to step #31).

That is, the conveyance control unit 10 re-raises the lift plate 8 that has been lowered by the lowering amount. The conveyance control unit 10 rotates the lift motor 81. The conveyance control unit 10 re-raises the lift plate 8 until the uppermost document comes into contact with the pickup roller 12 (up to the upper limit of the pickup roller 12 and the lift plate 8). After re-raising, the conveyance control unit 10 executes step #32, and starts feeding. That is, the conveyance control unit 10 rotates the pickup roller 12, the first sheet feeding roller 71, the second sheet feeding roller 72, the sheet feeding belt 73, and the retard roller 70. The conveyance control unit 10 rotates these rotators to feed the document in the document conveyance direction.

(Operation in Manual Feed Mode)

Figure 10:
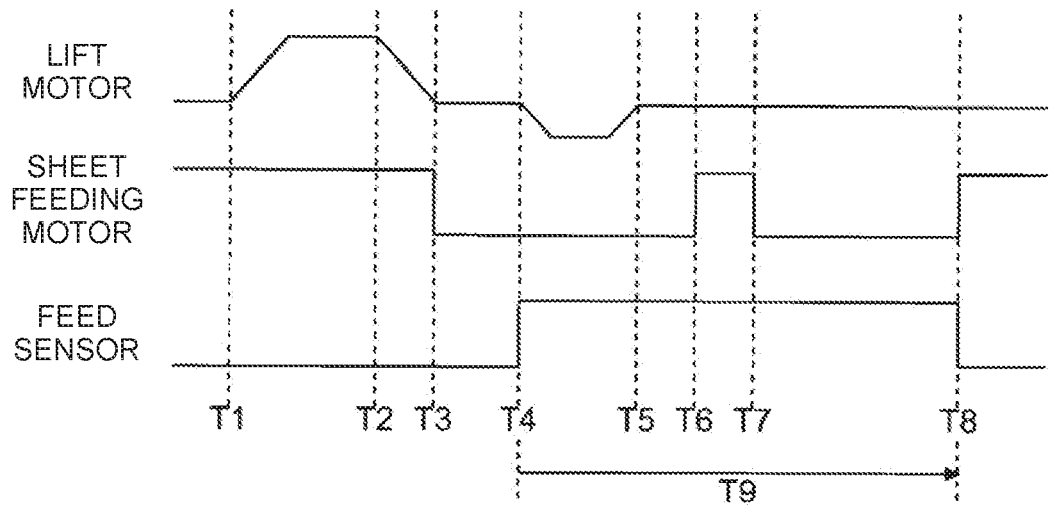
FIG. 10 is a timing chart showing an example of the operation in a manual feed mode according to the embodiment.

Next, an example of the operation in the manual feed mode according to the embodiment will be described with reference to FIG. 10. FIG. 10 is a timing chart showing an example of the operation in the manual feed mode according to the embodiment.

The uppermost chart in the timing charts of FIG. 10 is a chart showing the operation of the lift motor 81. The middle chart is a chart showing the operation of the sheet feeding motor 17. The lowermost chart is a diagram showing an example of the output level of the feed sensor 19. The feed sensor 19 in the example of FIG. 10 outputs a High level when a document is detected, and outputs a Low level when no document is detected.

The time point T1 in FIG. 10 is the time point when the lift plate 8 starts to rise. The conveyance control unit 10 rotates the lift motor 81 in the direction in which the lift plate 8 rises. The conveyance control unit 10 accelerates the lift motor 81, and rotates it at a predetermined speed. The time point T2 is the time point when the conveyance control unit 10 recognizes that the lift plate 8 has reached to its upper limit. The conveyance control unit 10 starts stopping the lift motor 81.

The time point T3 is the time point when the conveyance control unit 10 starts to rotate the sheet feeding motor 17. The conveyance control unit 10 rotates the sheet feeding motor 17 in the second direction (reverse direction). Therefore, in FIG. 10, the state in which the sheet feeding motor 17 rotates is illustrated at the Low level.

The time point T4 is the time point when the conveyance control unit 10 recognizes that the leading edge of a document has reached the feed sensor 19, based on the output of the feed sensor 19. At this time, the conveyance control unit 10 rotates the lift motor 81. The conveyance control unit 10 rotates the lift motor 81 in the direction in which the lift plate 8 is lowered.

The time point T5 is the time point when the stop of the rotation of the lift motor 81 by the conveyance control unit 10 is completed. By this lowering, the lift plate 8 is moved down by a predetermined lowering amount. The time point T6 is the time point when the conveyance control unit 10 temporarily stops the rotation of the sheet feeding motor 17. After the conveyance control unit 10 recognizes that the leading edge of the document has reached the feed sensor 19, the conveyance control unit 10 continues to rotate the sheet feeding motor 17. As the sheet feeding motor 17 continues to rotate, the leading edge of the document hits the registration roller pair 13 in the stopped state, and the document bends. Too much bending is also not preferable. Therefore, after the conveyance control unit 10 recognizes that the leading edge of the document has reached the feed sensor 19, the conveyance control unit 10 stops the sheet feeding motor 17 at time T6 when a bending generation time has elapsed.

The time point T7 is the time point when the conveyance control unit 10 resumes the rotation of the sheet feeding motor 17. Also at this time, the conveyance control unit 10 rotates the sheet feeding motor 17 in the second direction. At time point T7, the conveyance control unit 10 also starts to rotate the registration roller pair 13.

The time point T8 is the time point when the feed sensor 19 detects that the trailing edge of the document has passed. The conveyance control unit 10 recognizes that the trailing edge of the document has passed the feed sensor 19, based on the output of the feed sensor 19. Based on the recognition, the conveyance control unit 10 stops the sheet feeding motor 17.

(Mode Selection)

Figure 11:
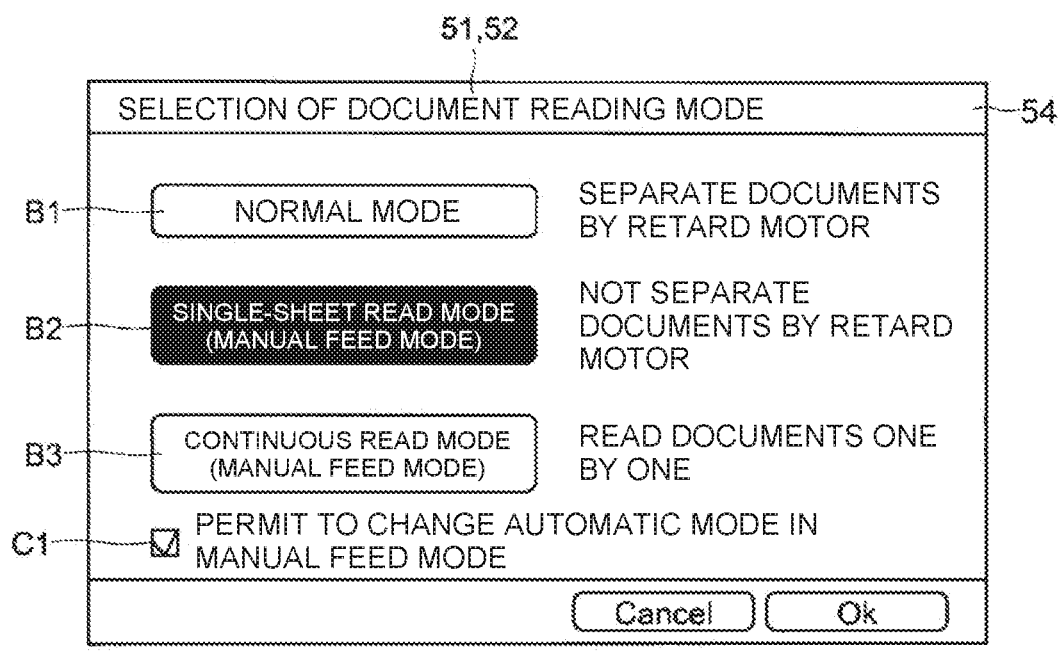
FIG. 11 is a diagram showing an example of a mode selection screen according to the embodiment.

Next, an example of a mode selection screen 54 according to the embodiment will be described with reference to FIG. 11. FIG. 11 is a diagram showing an example of the mode selection screen 54 according to the embodiment.

It is possible to select whether to use the normal mode, the single-sheet read mode, or the continuous read mode. FIG. 11 shows an example of the mode selection screen 54 regarding reading. When the operation panel 5 receives an operation for displaying the mode selection screen 54, the main control unit 2 displays the mode selection screen 54 on the display panel 51. The user selects the mode before starting a job for reading a document.

Note that, when an instruction to start executing a job is issued without selecting a mode, the main control unit 2 instructs the conveyance control unit 10 to execute the conveyance reading in the default mode. Based on the instruction, the conveyance control unit 10 feeds and conveys a document in the default mode. The default mode is predetermined. The operation panel 5 may receive the selection of the default mode. For example, the normal mode is set to the default mode.

The mode selection screen 54 is provided with a normal mode selection button B1, a single-sheet read mode selection button B2, a continuous read mode selection button B3, and an automatic change permission check box C1.

When the user desires to convey a document in the normal mode, the user operates the normal mode selection button B1. When the user desires to convey a document in the single-sheet read mode, the user operates the single-sheet read mode selection button B2. When the user desires to convey a document in the continuous read mode, the user operates the continuous read mode selection button B3. The main control unit 2 recognizes the selected mode, based on the output of the operation panel 5. When starting to read a document, the main control unit 2 notifies the conveyance control unit 10 of the selected mode.

As described above, the operation panel 5 accepts the selection of which of the normal mode and the manual feed mode is used. The conveyance control unit 10 executes to read a document in the selected mode.

The automatic change permission check box C1 is a check box for selecting whether to permit automatic mode change during the manual feed mode. When the user permits the automatic change, the user operates the automatic change permission check box C1 to activate the check. When the user does not permit the automatic change, the user operates the automatic change permission check box C1 to deactivate the check. The main control unit 2 recognizes whether there is a check, based on the output of the operation panel 5.

When starting to read a document, the main control unit 2 notifies the conveyance control unit 10 of whether to permit the automatic mode change. When the conveyance control unit 10 receives a notification indicating that the automatic change is permitted, the conveyance control unit 10 automatically changes (selects) the mode in the conveyance reading and the manual feed mode. When the conveyance control unit 10 receives a notification that the automatic change is not permitted, the conveyance control unit 10 maintains the mode selected on the mode selection screen 54.

Note, when the normal mode is selected (when the normal mode selection button B1 is operated), and a plurality of documents are set on the lift plate 8, the conveyance control unit 10 rotates the retard roller 70 for all the documents to feed back the documents in the direction opposite to the document conveyance direction.

(Automatic Change to Single-Sheet Read Mode During Continuous Read Mode)

Figure 12:
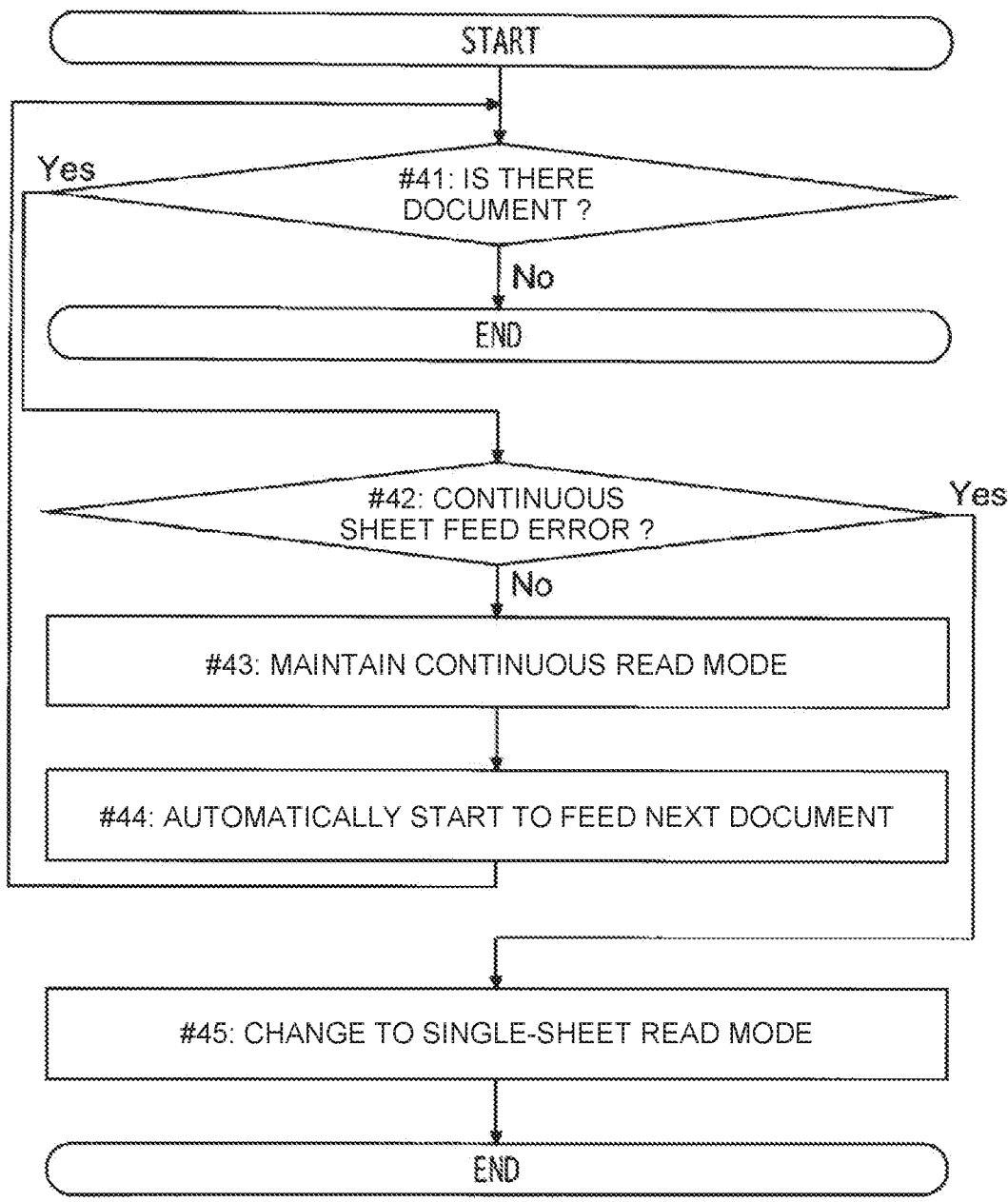
FIG. 12 is a diagram showing an example of the flow of automatic change from the continuous read mode to the single-sheet read mode according to the embodiment.

Next, an example of the flow of automatic change to the single-sheet read mode during the continuous read mode according to the embodiment will be described with reference to FIG. 12. FIG. 12 is a diagram showing an example of the flow of automatic change from the continuous read mode to the single-sheet read mode according to the embodiment.

There are two cases to initiate the START in FIG. 12. The first case is a time point when starting the conveyance reading in the continuous read mode of the manual feed mode in a state where the automatic change is permitted. In other words, the first case is the time point when starting to feed the first document in the continuous read mode in the automatic change permission state. The second case is a time point when firstly starting to feed a document after the automatic change (automatic selection) to the continuous read mode performed by the automatic change.

The conveyance control unit 10 confirms whether there is a document (whether a document remains) on the lift plate 8 (step #41). When no document remains on the lift plate 8 (No in step #41), the conveyance control unit 10 ends the processing of the flowchart (END).

Next, the conveyance control unit 10 confirms whether a continuous sheet feed error has occurred in the document being fed (step #42). In other words, the conveyance control unit 10 confirms whether the trailing edge of the document currently being fed has passed the feed sensor 19 within the allowable time.

When the continuous sheet feed error does not occur (No in step #42), the conveyance control unit 10 maintains the continuous read mode (step #43). Then, the conveyance control unit 10 automatically starts to feed the next document in the continuous read mode (step #44). Specifically, the conveyance control unit 10 automatically raises the lift plate 8, and restarts the rotation of the sheet feeding motor 17. Then, the conveyance control unit 10 executes step #41 (return to step #41).

When a continuous sheet feed error occurs (Yes in step #42), it may not be preferable to feed a document in the continuous read mode. Therefore, the conveyance control unit 10 automatically changes the mode to the single-sheet read mode (the single-sheet read mode is automatically selected) (Step #45). Since the single-sheet read mode is automatically selected, the conveyance control unit 10 ends the processing of the flowchart based on the continuous read mode (END).

(Automatic Change to Continuous Read Mode During Single-Sheet Read Mode)

Figure 13:
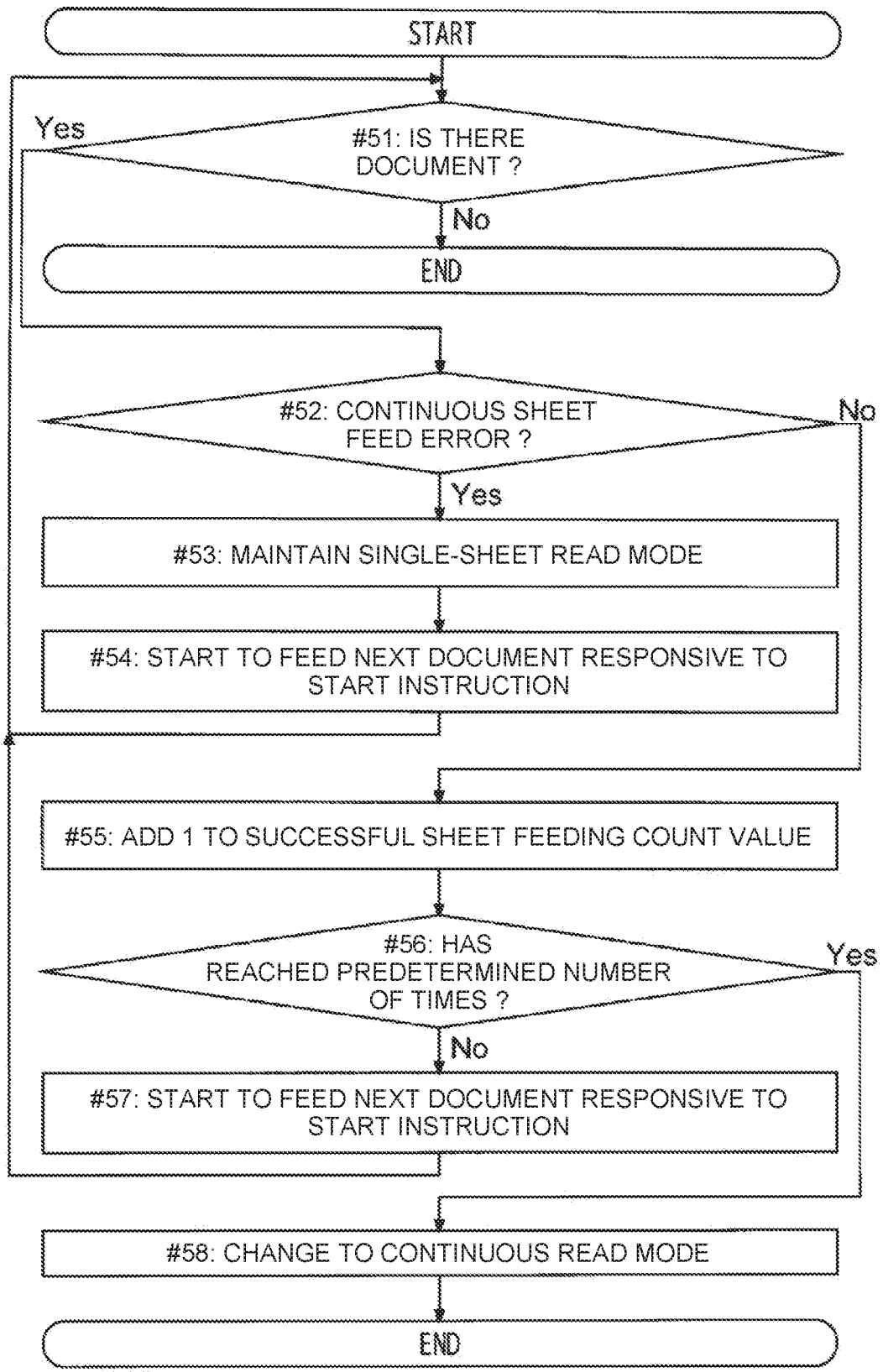
FIG. 13 is a diagram showing an example of the flow of automatic change from the single-sheet read mode to the continuous read mode according to the embodiment.

Next, an example of the flow of automatic change to the continuous read mode in the single-sheet read mode according to the embodiment will be described with reference to FIG. 13. FIG. 13 is a diagram showing an example of the flow of automatic change from the single-sheet read mode to the continuous read mode according to the embodiment.

There are two cases to initiate the START in FIG. 13. The first case is a time point when starting the conveyance reading in the single-sheet read mode of the manual feed mode in a state where the automatic mode change is permitted. That is, the first case is the time point when starting to feed a document in the single-sheet read mode in the automatic change permission state. The second case is a time point when starting to feed a document after the automatic change to the single-sheet read mode performed by the automatic change.

The conveyance control unit 10 confirms whether there is a document (whether a document remains) on the lift plate 8 (step #51). When no document remains on the lift plate 8 (No in step #51), the conveyance control unit 10 ends the processing of the flowchart (END).

Next, the conveyance control unit 10 confirms whether a continuous sheet feed error has occurred in the document being fed (step #52). In other words, the conveyance control unit 10 confirms whether the trailing edge of the document currently being fed has passed the feed sensor 19 within the allowable time.

When a continuous sheet feed error occurs (Yes in step #52), it may not be preferable to feed a document in the continuous read mode. Therefore, the conveyance control unit 10 maintains the single-sheet read mode (step #53).

When the operation panel 5 receives a reading start instruction after the operation for solving the continuous sheet feed error, the conveyance control unit 10 starts to feed the next document in the single-sheet read mode (step #54). Specifically, when the start button is operated, the conveyance control unit 10 raises the lift plate 8, and starts the rotation of the sheet feeding motor 17. Then, the conveyance control unit 10 executes step #51 (return to step #51).

When no continuous sheet feed error has occurred (No in step #52), the conveyance control unit 10 adds 1 to a successful sheet feeding count value (step #55). The successful sheet feeding count value is stored in the memory 10b in the conveyance control unit 10, for example. Note that, when no document remains on the lift plate 8 or when a predetermined reset time has elapsed since the previous sheet feeding, the conveyance control unit 10 resets the successful sheet feeding count value (sets to 0).

The conveyance control unit 10 confirms whether the successful sheet feeding count value has reached a predetermined number of times (Step #56). In other words, in the state where a plurality of documents are set in the single-sheet read mode, the conveyance control unit 10 confirms whether documents can be fed without a problem for the predetermined number of times in a row.

In the case that the successful sheet feeding count value has not reached the predetermined number of times (No in step #56), when the operation panel 5 accepts the reading start instruction, the conveyance control unit 10 starts to feed the next document in the single-sheet read mode (step #57). That is, when the successful sheet feeding count value has not reached the predetermined number of times (No in step #56), the conveyance control unit 10 maintains the single-sheet read mode. After step #57, the conveyance control unit 10 executes step #51 (return to step #51).

When the successful sheet feeding count value has reached the predetermined number of times (Yes in step #56), it is recognized that there is no problem even if switching to the continuous read mode. Therefore, the conveyance control unit 10 automatically changes the mode to the continuous read mode (automatic selection) (step #58). Since the continuous read mode is selected, the conveyance control unit 10 ends the processing of the flowchart based on the single-sheet read mode (END).

(In Case where Automatic Mode Change is not Permitted)

Next, an example of the operation when the automatic mode change is not permitted will be described with reference to FIG. 14. FIG. 14 is a diagram showing an example of the operation when the automatic mode change is not permitted.

The operation panel 5 accepts the selection of which of the normal mode and the manual feed mode is used. That is, the operation panel 5 accepts the selection to use only the normal mode. When the normal mode is selected, the conveyance control unit 10 maintains the sheet feeding and conveyance in the normal mode from the first sheet to the last sheet of the document.

Further, the operation panel 5 accepts the selection to use only the continuous read mode. In other words, the operation panel 5 accepts the operation of the continuous read mode selection button B3 as the selection to use only the continuous read mode, in a state in which the automatic change permission check box C1 is not checked. In this case, the conveyance control unit 10 does not automatically change to the single-sheet read mode during the continuous read mode.

Also, the operation panel 5 accepts the selection to use only the single-sheet read mode. In other words, the operation panel 5 accepts the operation of the single-sheet read mode selection button B2 as the selection to use only the single-sheet read mode, in a state in which the automatic change permission check box C1 is not checked. In this case, the conveyance control unit 10 does not automatically change to the continuous read mode during the single-sheet read mode.

In this way, the document feeder 1 according to the embodiment includes the lift plate 8, the pickup roller 12, the lift motor 81, the retard roller 70, and the control unit (conveyance control unit 10). Documents are set on the lift plate 8. The pickup roller 12 contacts the uppermost document among the documents set on the lift plate 8. The pickup roller 12 rotates to feed a document in the document conveyance direction. The lift motor 81 raises and lowers the lift plate 8. When starting the sheet feeding, the lift motor 81 raises the lift plate 8 until the uppermost document comes into contact with the pickup roller 12. The retard roller 70 is provided on the downstream side of the pickup roller 12 in the document conveyance direction. The retard roller 70 contacts the document fed by the pickup roller 12. When the normal mode is selected, the control unit rotates the retard roller 70 to feed the document in the direction opposite to the document conveyance direction. When the manual feed mode is selected, the control unit rotates the retard roller 70 to feed the document in the document conveyance direction. When the manual feed mode is selected, the control unit causes the lift motor 81 to start lowering the lift plate 8 while the pickup roller 12 is feeding the document, after the pickup roller 12 starts to rotate.

The lift plate 8 can be lowered while the document is being fed. By lowering the lift plate 8, the document does not come into contact with the pickup roller 12. Immediately after the fed document passes through the pickup roller 12, the next document is not fed even if the pickup roller 12 does not stop.

Further, it is possible to create a gap between the document being conveyed (uppermost document) and the second document from the top. It is possible to prevent the second or lower documents from the top from being dragged by the document being conveyed (uppermost document). It is possible to reduce the possibility that the second or lower documents from the top is conveyed to the retard roller 70 while the uppermost document is being conveyed. In the manual feed mode, the retard roller 70 rotates to feed the document in the document conveyance direction. Even if the retard roller 70 does not fulfill the functions of preventing continuous feeding and double feeding, it is possible to suppress the occurrence of the continuous feeding and double feeding of documents.

Further, the pickup roller 12 does not hold down the set document. If the pickup roller 12 holds down the uppermost document, documents below the uppermost document may be dragged by the uppermost document. By lowering the lift plate 8, it is possible to weaken the force by which the pickup roller 12 presses the bundle of documents.

The control unit causes the lift motor 81 to start lowering the lift plate 8, after the time obtained by dividing the distance from the pickup roller 12 to the retard roller 70 by the ideal document conveyance speed has elapsed after the pickup roller 12 starts its rotation. After the retard roller 70 catches the leading edge of the document, the lift plate 8 can be lowered. In other words, even if the pickup roller 12 is separated from the uppermost document, the lift plate 8 can be lowered after being brought in the state in which the uppermost document is continuously fed. It is possible to start lowering the lift plate 8 immediately when the problem does not occur even if the lift plate 8 is lowered.

The document feeder 1 includes the feed sensor 19. The feed sensor 19 is provided on the downstream side of the retard roller 70 in the document conveyance direction. The control unit recognizes that the leading edge of the document has reached the feed sensor 19, based on the output of the feed sensor 19. When the control unit recognizes that the leading edge of the document has reached the feed sensor 19, the control unit causes the lift motor 81 to start lowering the lift plate 8. The lift plate 8 can start to be lowered at the time when the document can be continuously conveyed even when the lift plate 8 is lowered. It is possible to feed the document to the downstream side in the document conveyance direction without any problem even when the lift plate 8 is lowered.

Alternatively, in case that the sheet feeding motor 17 is a stepping motor, when the control unit inputs pulses to the sheet feeding motor 17 by the predetermined number of lowering start pulses from starting the rotation of the pickup roller 12, the control unit may cause the lift motor 81 to start lowering the lift plate 8. In this case, the number of lowering start pulses is the value obtained by dividing the distance from the pickup roller 12 to the retard roller 70 by the movement amount of a document per pulse. Even in this case, the lift plate 8 can be started to be lowered at the time when a document is continuously conveyed even when the lift plate 8 is lowered. It is possible to feed a document to the downstream side in the document conveyance direction without any problem even when the lift plate 8 is lowered.

The control unit recognizes that the trailing edge of a document has passed the feed sensor 19, based on the output of the feed sensor 19. When the control unit recognizes that the trailing edge of the document has passed the feed sensor 19, the control unit stops the rotation of the pickup roller 12 and the retard roller 70. If one document is appropriately fed from the lift plate 8, the feed sensor 19 recognizes that the trailing edge of the document has passed. The control unit can stop the rotation of the pickup roller 12 and the retard roller 70 at a time at which the control unit can determine that the document has been appropriately fed. Since the lift plate 8 has been lowered, even if the pickup roller 12 continues to rotate after the document has passed through the pickup roller 12, the next document is not fed in the conveyance direction. It is possible to rotate the pickup roller 12 and the retard roller 70 without overs and shorts.

The control unit measures the required passage time T9 from the recognition that the leading edge of a document has reached the feed sensor 19 to the recognition that the trailing edge of the document has passed the feed sensor 19. The control unit detects that a continuous sheet feed error of the document has occurred, based on the length of the required passage time T9. When the control unit detects the occurrence of the continuous sheet feed error, the control unit stops the rotation of the pickup roller 12 and the retard roller 70. The control unit can detect the continuous sheet feed error that has occurred. When the unintended continuous sheet feeding occurs, the document may jam (clog). The control unit can stop conveying the document in order to prevent the document from being damaged due to the jam.

After the pickup roller 12 starts to rotate, when the lift plate 8 is lowered while the pickup roller 12 is feeding a document, the control unit causes the lift plate 8 to be lowered by the predetermined lowering amount. The control unit can lower the lift plate 8 without overs and shorts. The control unit can prevent the lift plate 8 from being excessively lowered while preventing the unintended continuous sheet feeding.

The lowering amount is the value in the range which is equal to or greater than the predetermined separation distance from the lower end of the peripheral surface of the pickup roller 12 to the document immediately below the uppermost document, and at which the document on the lift plate 8 does not fall below the predetermined lower limit height. The pickup roller 12 can be sufficiently separated from the document. When the uppermost document greatly droops, the document needs to be conveyed while being pulled up. When the document is greatly drooped, the image quality of the image data obtained by reading may decrease. Since the lift plate 8 is prevented from being excessively lowered, it is possible to prevent the uppermost document (the document being conveyed) from excessively dropping.

In the manual feed mode, the control unit sets the conveyance speed of a document to be slower than that in the normal mode. Since the conveyance speed of the document is suppressed in the manual feed mode, it is possible to eliminate or reduce the damage to the document when an error occurs.

The document feeder 1 includes the sheet feeding motor 17, the first drive mechanism 9*a*, the second drive mechanism 9*b*, and the third drive mechanism 9*c*. The sheet feeding motor 17 rotates the pickup roller 12 and the retard roller 70. When the sheet feeding motor 17 rotates in the first direction, the first drive mechanism 9*a* rotates the pickup roller 12 to feed a document in the document conveyance direction. When the sheet feeding motor 17 rotates in the second direction opposite to the first direction, the second drive mechanism 9*b* rotates the pickup roller 12 to feed a document in the document conveyance direction.

When the sheet feeding motor 17 rotates in the first direction, the third drive mechanism 9*c* rotates the retard roller 70 to feed a document in the direction opposite to the document conveyance direction. When the sheet feeding motor 17 rotates in the second direction, the third drive mechanism 9c rotates the retard roller 70 to feed a document in the document conveyance direction. It is possible to rotate the pickup roller 12 and the retard roller 70 in the correct direction in each mode. By using the first drive mechanism 9a, the second drive mechanism 9b, and the third drive mechanism 9c, a motor for rotating the pickup roller 12 and the retard roller 70 is only one sheet feeding motor 17.

Further, the document feeder 1 includes the document set sensor 16 and the operation panel 5. The document set sensor 16 detects whether a document is set on the lift plate 8. The operation panel 5 receives the selection of the mode. When the normal mode is selected, the control unit rotates the pickup roller 12 to feed a document in the document conveyance direction, and rotates the retard roller 70 to feed the document in the direction opposite to the document conveyance direction. When the manual feed mode is selected, the control unit rotates the pickup roller 12 and the retard roller 70 to feed a document in the document conveyance direction. After the pickup roller 12 starts rotating, the control unit causes the lift motor 81 to start lowering the lift plate 8 while the pickup roller 12 is feeding a document. The control unit stops the pickup roller 12 and the retard roller 70 after the trailing edge of the document has passed through the retard roller 70. Further, when the continuous read mode of the manual feed mode is selected, the control unit recognizes whether there is a document set on the lift plate 8, on the basis of the output of the document set sensor 16. When there is a document set on the lift plate 8 at the time when the pickup roller 12 and the retard roller 70 are stopped, the control unit re-raises the lift plate 8 until the uppermost document comes into contact with the pickup roller 12. After the completion of re-raising, the control unit rotates the pickup roller 12 and the retard roller 70 to feed a document in the conveyance direction, to automatically resumes the sheet feeding in the manual feed mode.

The lift plate 8 can be lowered while a document is conveyed. By lowering the lift plate 8, the document being conveyed does not come into contact with the pickup roller 12. Further, it is possible to create a gap between the document being conveyed (uppermost document) and the second document from the top. It is possible to prevent the second or subsequent documents from the top from being dragged by the document being conveyed. It is possible to suppress the occurrence of unintended continuous sheet feeding.

Further, in the continuous read mode, a plurality of documents can be fed continuously one by one and in the manual feed mode. In the processing of feeding documents one by one, lifting and lowering of the lift plate 8 and the rotation of each roller are automatically executed. It is not necessary to issue the instruction to raise again the lift plate 8 or the instruction to start the document conveyance (reading) every time one document is conveyed. It is possible to automatically read a plurality of documents in the manual feed mode without double feeding or unintended continuous sheet feeding.

The control unit measures the required passage time T9 from the recognition that the leading edge of a document has reached the feed sensor 19 to the recognition that the trailing edge of the document has passed the feed sensor 19. Based on the length of the required passage time T9, the control unit detects that a continuous sheet feed error of the document has occurred. When the control unit detects that a continuous sheet feed error has occurred in the continuous read mode, the control unit automatically selects the single-sheet read mode. The single-sheet read mode is one of the manual feed modes. In the single-sheet read mode, the control unit raises the lift plate 8 and feeds one document in the manual feed mode after the operation panel 5 accepts the single-sheet reading start instruction.

It is difficult to completely reduce the number of continuous sheet feed errors to 0. Therefore, when the control unit detects the occurrence of a continuous sheet feed error during reading in the continuous read mode, the control unit can automatically change the manual feed mode from the continuous read mode to the single-sheet read mode. The single-sheet read mode is the mode for reading a document sheet by sheet. It is possible to automatically switch to a mode which can read a document while checking the sheets one by one, to prevent from occurring the continuous sheet feed error.

When a predetermined number of documents are conveyed without causing a continuous sheet feed error in the single-sheet read mode, the control unit automatically selects the continuous read mode. When it is recognized that the continuous sheet feed error is unlikely to occur in the continuous read mode, it is possible to automatically switch from the single-sheet read mode to the continuous read mode.

The operation panel 5 accepts the selection to use only the continuous read mode. When the selection to use only the continuous read mode is made, the control unit does not automatically change to the single-sheet read mode during the continuous read mode. Some users do not desire to automatically switch to the single-sheet read mode. A user who does not desire the automatic switching may continue to use only the desired mode (only the continuous read mode).

The operation panel 5 accepts the selection to use only the single-sheet read mode. When the selection to use only the single-sheet read mode is made, the control unit does not automatically select the continuous read mode during the single-sheet read mode. Some users do not desire to automatically switch to the continuous read mode. A user who does not desire the automatic switching may continue to use only the desired mode (only the single-sheet read mode).

The operation panel 5 accepts the selection of which one of the normal mode and the manual feed mode is used. The control unit causes a document to be read in the selected mode. The user can select whether to use the normal mode or the manual feed mode. It is possible to read the document in the selected mode.

Included is a double feed detection sensor 111 for detecting double feed for documents. The output of the double feed detection sensor 111 is input to the control unit. When feeding a document in the normal mode, the control unit determines whether the double feeding has occurred, on the basis of the output of the double feed detection sensor 111. When feeding in the manual feed mode, the control unit does not determine whether the double feeding has occurred, based on the output of the double feed detection sensor 111. The manual feed mode is assumed to feed and convey a document such as a slip on which a plurality of sheets are stacked. Even if a single document in which multiple sheets is stacked is fed and conveyed in the manual feed mode, it is not erroneously detected as the double feeding.

Although the embodiments of the present disclosure have been described above, the scope of the present disclosure is not limited thereto, and various modifications may be made without departing from the spirit of the disclosure.

The present disclosure is applicable to a document feeder that brings a pickup roller into contact with a document by using a lift plate.

What is claimed is:

1. A document feeder, comprising:
a lift plate on which documents are set;
a pickup roller which contacts an uppermost document among the documents set on the lift plate, and rotates to feed a document in a document conveyance direction;
a lift motor which raises and lowers the lift plate, and raises the lift plate until the uppermost document contacts the pickup roller when starting sheet feeding;
a retard roller which is provided on a downstream side of the pickup roller in the document conveyance direction, and is in contact with the document fed by the pickup roller;
a document set sensor which detects whether the document is set on the lift plate;
an operation panel that receives a selection of a mode; and
a control unit which:
when a normal mode is selected, rotates the pickup roller to feed the document in the document conveyance direction, and rotates the retard roller to feed the document in a direction opposite to the document conveyance direction,
when a manual feed mode is selected,
rotates the pickup roller and the retard roller to feed the document in the document conveyance direction,
after the pickup roller starts rotating, causes the lift motor to start lowering the lift plate while the pickup roller is feeding the document,
after the trailing edge of the document has passed through the retard roller, stops the pickup roller and the retard roller,
further, when a continuous read mode is selected in the manual feed mode,
recognizes whether there is a document set on the lift plate based on an output of the document set sensor,
at the time when the pickup roller and the retard roller are stopped, when there is a document set on the lift plate, re-raises the lift plate until the uppermost document comes into contact with the pickup roller, and
after the re-raising is completed, rotates the pickup roller and the retard roller to feed the document in the document conveyance direction to automatically restart a sheet feeding in the manual feed mode.

2. The document feeder according to claim 1, the document feeder further comprising:
a feed sensor provided on a downstream side of the retard roller in the conveyance direction,
wherein the control unit:
recognizes that the leading edge of the document has reached the feed sensor based on an output of the feed sensor,
recognizes that the trailing edge of the document has passed the feed sensor based on the output of the feed sensor,
measures a required passage time from the recognition that the leading edge of the document has reached the feed sensor to the recognition that the trailing edge of the document has passed the feed sensor,
detects that a continuous sheet feed error of the document has occurred, based on the length of the required passage time, and
automatically selects a single-sheet read mode when detected that the continuous sheet feed error has occurred in the continuous read mode,
wherein the single-sheet read mode is one mode of the manual feed mode, and
wherein, in the single-sheet read mode,
the control unit raises the lift plate and feeds one sheet of the document in the manual feed mode after the operation panel receives an instruction for starting a single-sheet reading.

3. The document feeder according to claim 2,
wherein, when a predetermined number of documents are conveyed without the continuous sheet feed error in the single-sheet reading mode, the control unit automatically selects the continuous read mode.

4. The document feeder according to claim 2,
wherein the operation panel receives a selection using only the continuous read mode, and
wherein, when the selection using only the continuous read mode is made, the control unit does not execute an automatic change to the single-sheet read mode during the continuous read mode.

5. The document feeder according to claim 2,
wherein the operation panel receives a selection using only the single-sheet read mode, and
wherein, when the selection using only the single-sheet read mode is made, the control unit does not execute an automatic selection to the continuous read mode during the single-sheet read mode.

6. The document feeder according to claim 1,
wherein the operation panel receives a selection of which of the normal mode and the manual feed mode is used, and
wherein the control unit causes the document to be read in a selected mode.

7. The document feeder according to claim 1, the document feeder further comprising:
a double feed detection sensor to detect double feeding of documents,
wherein the control unit:
receives an output of the double feed detection sensor,
determines whether double feeding has occurred, based on the output of the double feed detection sensor when feeding in the normal mode, and
when feeding in the manual feed mode, does not determine whether double feeding has occurred based on the output of the double feed detection sensor.

* * * * *